US009833744B2

(12) United States Patent
Velegol et al.

(10) Patent No.: US 9,833,744 B2
(45) Date of Patent: Dec. 5, 2017

(54) MEMBRANE FOULING REDUCTION USING CHEMICAL MICROPUMPS

(71) Applicant: The Penn State Research Foundation, University Park, PA (US)

(72) Inventors: Darrell Velegol, State College, PA (US); Abhishek Kar, State College, PA (US); Rajarshi Guha, State College, PA (US); Manish Kumar, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 332 days.

(21) Appl. No.: 14/551,491

(22) Filed: Nov. 24, 2014

(65) Prior Publication Data

US 2016/0375407 A1      Dec. 29, 2016

Related U.S. Application Data

(60) Provisional application No. 61/907,464, filed on Nov. 22, 2013.

(51) Int. Cl.
*B01D 65/02*      (2006.01)
*C02F 1/44*       (2006.01)
(Continued)

(52) U.S. Cl.
CPC ........... *B01D 65/02* (2013.01); *B01D 61/025* (2013.01); *B01D 65/08* (2013.01); *B01D 71/16* (2013.01);
(Continued)

(58) Field of Classification Search
CPC .. B01D 65/02; B01D 2321/06; B01D 61/025; B01D 71/16; B01D 71/56; B01D 61/02
See application file for complete search history.

(56) References Cited

U.S. PATENT DOCUMENTS

| 2002/0136770 A1 | 9/2002 | Quong |
| 2007/0181497 A1* | 8/2007 | Liberman ............ B01D 61/025 210/636 |

(Continued)

FOREIGN PATENT DOCUMENTS

EP      1920821 A1      5/2008

OTHER PUBLICATIONS

Abécassis, B. et al., "Boosting migration of large particles by solute contrasts," Nature Materials 2008, 7, 785-789.
(Continued)

*Primary Examiner* — Ana Fortuna
(74) *Attorney, Agent, or Firm* — Dinsmore & Shohl LLP

(57) ABSTRACT

Provided are processes of removing particulate fouling from a filtration membrane or for preventing membrane fouling by particulate matter. A process capitalizes on reversal of a naturally occurring diisophoretic particle deposition to actively move particulate material away from a membrane. A process includes placing a microparticle including a salt in proximity to a membrane such that the microparticle creates a gradient generated spontaneous electric field or a gradient generated spontaneous chemiphoretic field in the solvent proximal to the membrane that actively draws charged particles away from the membrane thereby removing charged particulate matter away from the membrane or preventing its deposition.

17 Claims, 16 Drawing Sheets

(51) Int. Cl.
*B01D 61/02* (2006.01)
*B01D 65/08* (2006.01)
*B01D 71/16* (2006.01)
*B01D 71/56* (2006.01)

(52) U.S. Cl.
CPC ........ *B01D 71/56* (2013.01); *B01D 2313/143* (2013.01); *B01D 2321/16* (2013.01); *B01D 2321/168* (2013.01); *B01D 2321/22* (2013.01); *B01D 2323/30* (2013.01); *B01D 2325/26* (2013.01); *B01D 2325/28* (2013.01)

(56) References Cited

U.S. PATENT DOCUMENTS

| | | |
|---|---|---|
| 2011/0027599 A1 | 2/2011 | Hoek et al. |
| 2015/0068978 A1* | 3/2015 | Lando ................ B01D 67/0088 210/636 |
| 2016/0280566 A1* | 9/2016 | Rau, III .................. C02F 1/463 |

OTHER PUBLICATIONS

Chen, P.Y. et al., "Diffusiophoresis and electrophoresis of a charged sphere parallel to one or two plane walls," J. Col. Int. Sci. 2005, 286, 784-791.
Faibish, R.S. et al., "Effect of Interparticle Electrostatic Double Layer Interactions on Permeate Flux Decline in Crossflow Membrane Filtration of Colloidal Suspensions: an Experimental Investigation," J. Coll. Int. Sci. 1998, 204, 77-86.
Hadidi, M. et al., "Fouling behavior of zwitterionic membranes: Impact of electrostatic and hydrophobic interactions," J. Mem. Sc. 2013, 452, 97-103.
Hoek, E.M. et al., "Cake-Enhanced Concentration Polarization: A New Fouling Mechanism for Salt-Rejecting Membranes," Environ. Sci. Technol. 2003, 37, 5581-5588.
Hoek, E. et al., "Influence of Crossflow Membrane Filter Geometry and Shear Rate on Colloidal Fouling in Reverse Osmosis and Nanofiltration Separations," Environmental Engineering Science 2002, 19, 6, 357-372.
McDermott, J. J. et al., "Self-Generated Diffusioosmotic Flows from Calcium Carbonate Micropumps," Langmuir 2012, 28, 15491-15497.
Sim, N.S. et al., "Investigations of the coupled effect of cake-enhanced osmotic pressure and colloidal fouling in RO using crossflow sampler-modified fouling index ultrafiltration," Desalination 2011, 273, 184-196.
Song, L. et al., "Particle Deposition onto a Permeable Surface in Laminar Flow," Journal of Colloid and Interface Science 1995, 173, 165-180.
McDermott et al., "Self-Generated Diffusiosmotic Flows from Calcium Micropumps," Langmuir. 24(44):15491-15497, 2012.
International Search Report and Written Opinion for co-pending PCT application No. PCT/US2014/067008, dated Feb. 23, 2015.

* cited by examiner

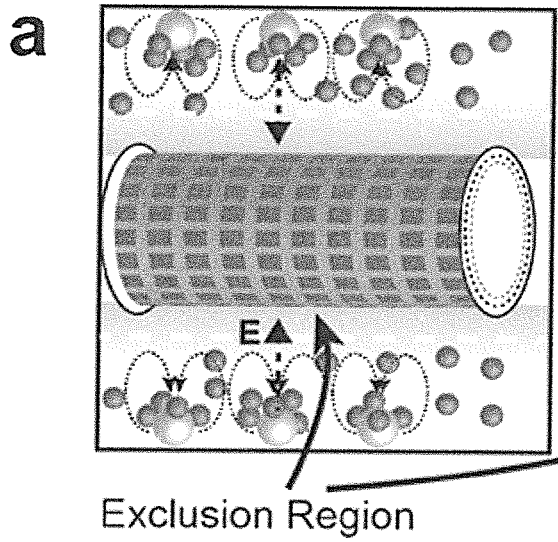
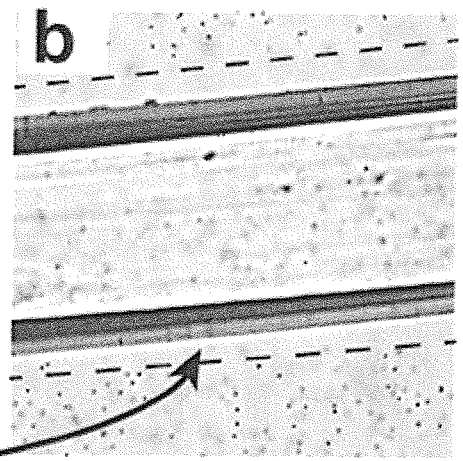
Exclusion Region
FIG. 7A
FIG. 7B
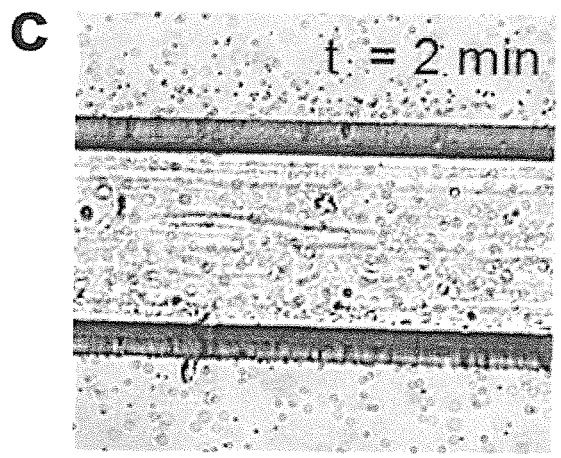
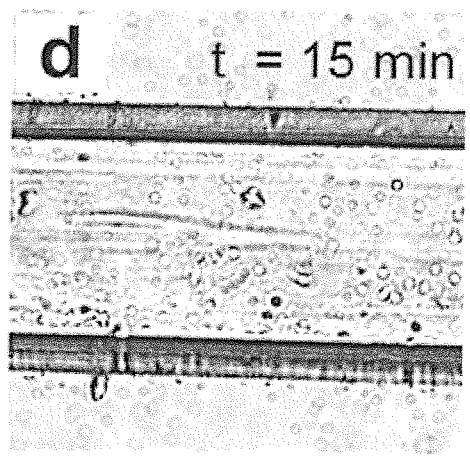
FIG. 7C
FIG. 7D

MEMBRANE FOULING REDUCTION USING CHEMICAL MICROPUMPS

CROSS REFERENCE TO RELATED APPLICATIONS

This application depends from and claims priority to U.S. Provisional Application No. 61/907,464 filed Nov. 22, 2013, the entire contents of which are incorporated herein by reference.

STATEMENT OF GOVERNMENT SUPPORT

This invention was made with government support under Grant No. CBET1014673, awarded by the National Science Foundation and under Contract No. FA9550-10-1-0509, awarded by the United States Air Force/AFOSR. The Government has certain rights in the invention.

FIELD OF THE INVENTION

The present inventions relate to methods of preventing or reducing concentration polarization and fouling in membrane systems, thus improving their energy efficiency and reducing chemical usage by utilizing chemically driven flows in these systems.

BACKGROUND OF THE INVENTION

Synthetic polymeric and inorganic membranes are used widely in several areas for aqueous separations. Some specific examples include use in dairy, food, pharmaceuticals, industrial processes, and municipal water treatment. Two persistent issues in these membrane systems that increase their energy use are 1) concentration polarization where solute builds up on the membrane surface and reduces driving force for transport of solvent, and 2) colloidal particle and microorganism deposition on the membrane that eventually leads to fouling and performance deterioration in these systems.

It is commonly accepted that in pressure driven separation processes such as reverse osmosis (RO), particulate foulants primarily deposit on the membrane surface due to convective filtration whereby particles that cannot penetrate the membrane are deposit on the membrane surface. The resulting cake layer hinders back diffusion of salts due to tortuosity leading to an enhanced buildup of a high salt concentration at the membrane surface. This salt buildup is higher than what would be expected in the absence of a cake layer due to hindered diffusion of salts away from the membrane, which is typically referred to as Cake Enhanced Concentration Polarization (CECP). The increase in salt concentration at the membrane surface enhances osmotic pressure leading to high flux decline. The performance deterioration results in lower productivity, solute leakage and loss of membrane integrity.

As such, there is a need for new materials and processes of preventing or reversing the causes of membrane performance deterioration.

SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

Provided are processes of preventing or removing foulant(s) from a membrane. A process includes: optionally placing a membrane in a solvent comprising a microparticle, said microparticle comprising a salt; positioning a microparticle comprising a salt positioned in contact with the solvent relative to the membrane so as to produce a gradient generated spontaneous electric field or a gradient generated spontaneous chemiphoretic field, the field in said solvent proximal to said membrane, the electric field removing or preventing deposits of particles on said membrane. The microparticle is optionally positioned for a treatment time, optionally 1 hour to three days, or any value or range therebetween. A salt includes an anion and a cation that have different diffusion coefficients in the solvent. In some aspects, the anion has a higher diffusion coefficient than the cation. A salt is optionally a carbonate salt, optionally $CaCO_3$, $Na_2CO_3$, $BaCO_3$, $H_2CO_3$, $MgCO_3$, $Li_2CO_3$, $K_2CO_3$, KI, NaCl, LiCl, KCl, or any combination thereof. A microparticle is optionally located on a surface, optionally placed in a retaining structure (optionally a hydrogel or the like), or otherwise placed and/or maintained a distance from the membrane. The microparticles optionally have a diameter of 1 nanometer to 100 micrometers, or any value or range therebetween, optionally 3 micrometers to 15 micrometers. A solvent is optionally aqueous. Many types of membranes are suitable for inclusion in the processes. Optionally, a membrane is negatively charged. Optionally, a membrane is a reverse osmosis membrane or suitable for use as a reverse osmosis membrane. A membrane optionally includes a polyamide, cellulose acetate, or combinations thereof. Microparticles are optionally positioned and optionally maintained a functional distance from the membrane, optionally microparticles are positioned within 1000 micrometers, optionally 100 micrometers, from the membrane.

BRIEF DESCRIPTION OF THE DRAWINGS

FIG. 7A is a schematic of $CaCO_3$ micropumps used to prevent particle deposition the membrane surface;

FIG. 7B illustrates the exclusion zone creation by $CaCO_3$ microparticles as seen experimentally at t=4 minutes;

FIG. 7C illustrates the experimental setup using $CaCO_3$ microparticles as after t=2 min;

FIG. 7D illustrates the experimental setup using $CaCO_3$ microparticles as after t=15 min;

DETAILED DESCRIPTION OF THE INVENTION

Figure 1:
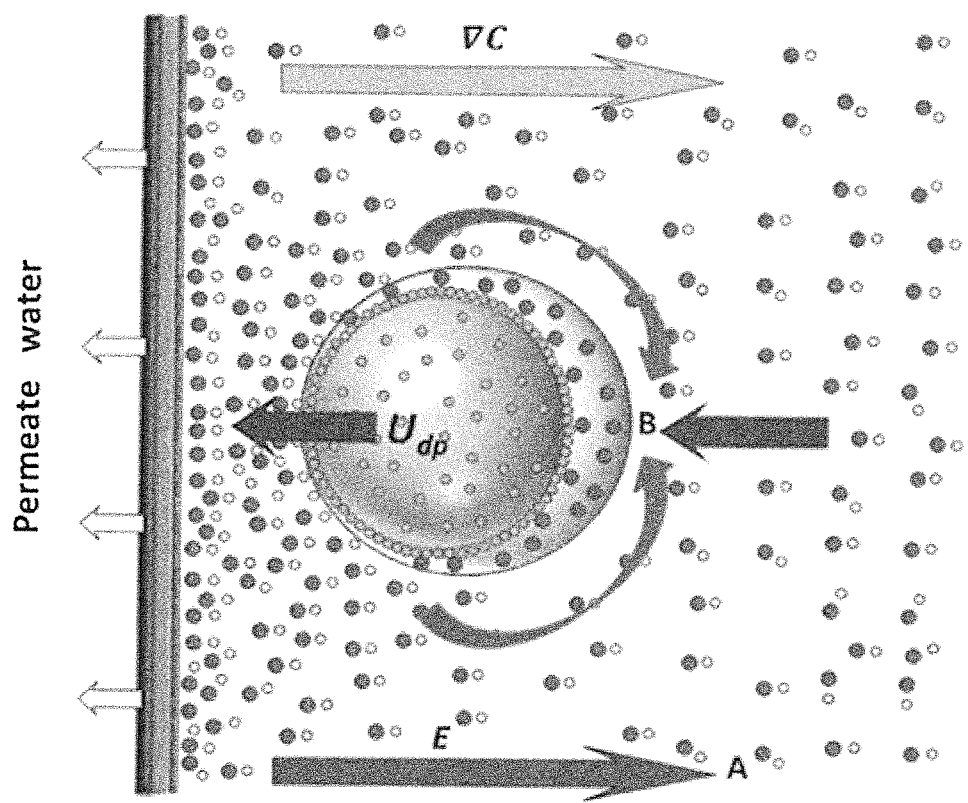
FIG. 1 illustrates a proposed model for diffusiophoresis (DP) driving particles towards a membrane where salt rejection sets up a large and stable salt concentration gradient and DP arises when the difference in the diffusivity of electrolyte ions (e.g. $Na^+$ and $Cl^-$) within the salt gradient sets up a spontaneous electric field (E) that drives negatively-charged colloids towards the membrane, which can lead to more cake formation and subsequently higher rates of particle deposition through cyclic magnification of the diffusiophoresis effect (membrane at left; open circles—anion; closed circles with paired circle represent cation and charge, respectively)

The following description of particular embodiment(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular embodiments only and is not intended to be limiting. As used herein, the singular forms "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

The processes and systems provided address the need for maintenance of membrane materials used in filtration systems. The processes utilize the process of diffusiophoresis (DP), a concentration gradient-driven phenomenon that is believed to contribute to particle deposition and membrane fouling in the presence of a salt gradient. The processes provided reverse the direction of diffusiophoretic transport using chemical micropumps as an effective fouling reduction process in various membrane systems.

Without being limited to one particular theory, it is believed that under certain operating conditions, in addition to passive transport of particles in the fluid, diffusiophoresis also contributes significantly to particle transport towards the membrane and subsequent colloidal fouling. Also, since cake formation exacerbates concentration polarization over time, particulate fouling due to DP will increase cyclically until shear forces applied by crossflow become sufficiently large to limit cake growth.

The inventions have applications for fouling mitigation in low pressure (microfiltration and ultrafiltration), high pressure (nanofiltration and reverse osmosis) and engineered osmosis (forward osmosis and pressure retarded osmosis) membrane systems. The use of the invention will assist in reducing energy required to maintain membrane systems, use of cleaning and maintenance chemicals, and reducing the needed frequency of filter and filter system maintenance.

The inventive processes are based on diffusiophoresis, which can cause particle transport towards or away from membranes in the presence of a salt gradient. Despite the fact that the transport process of diffusiophoresis has been known for over 65 years[3], this mechanism has not been examined in membrane science to explain particle deposition on membrane surfaces.

Diffusiophoresis is a process of particle transport in a salt gradient[4-7]. The process has been shown experimentally to cause transport of particles in steady-state salt gradients[8], and the experimental results are well-explained using electrokinetic modeling[9]. In some embodiments, dissolving calcium carbonate particles, and other geologic and biologic systems, have been used to create salt gradients that drive particle motion[10] through this mechanism.

When a salt gradient exists, the ions from the salt often diffuse at different rates based on their different diffusion coefficients in the solution. A finite difference in diffusion coefficients of the constituent ions can give rise to a spontaneous electric field (E) in solutions[6], which then causes electrophoresis of particles. The spontaneous electric field arises due to the difference between cationic and anionic diffusivities as shown in FIG. 1. For example, in the case of Na$^+$ and Cl$^-$, the Cl$^-$ diffuses slightly faster, and in the arrangement of FIG. 1 would diffuse to the right faster. In order to maintain electroneutrality in the system, the spontaneous electric field arises.

Furthermore, the particles can also migrate due to a "chemiphoretic" mechanism[4-6]. In essence, within the electrical double layer (EDL), the fluid pressure is higher than in the bulk, and this pressure increases with ionic strength (smaller Debye length). Thus, when a gradient of ionic strength exists, a pressure gradient exists across the surface. For a symmetric Z:Z electrolyte, the combination of these two effects results in particle motion with a speed ($U_{dp}$) given by:

$$U_{dp} = \frac{\varepsilon}{\eta}\left\{\frac{kT}{Ze}\frac{D_+ - D_-}{D_+ + D_-}\zeta_p - \frac{2k^2T^2}{Z^2e^2}\ln\left[1 - \tanh^2\left(\frac{Ze\zeta_p}{4kT}\right)\right]\right\}\frac{\nabla n}{n} \quad (1)$$

where e is the proton charge, $\varepsilon$ is the permittivity of the medium, $\eta$ is the solution viscosity, $D_+$ and $D_-$ are the diffusivities of cation and anion respectively, $\zeta_p$ is the particle zeta potential, k is the Boltzmann constant, T is temperature and n is the concentration of the salt. Typically, a charged particle with a zeta potential of order of 2 kT/e (~50 mV) will move due to electrolyte gradient of 1 M/cm with speeds of several micrometers/sec.

The higher the difference between constituent ion diffusivities (quantified by $\beta=(D_+-D_-)/(D_++D_-)$), the stronger is this electric field (E). DP of particles in electrolyte solutions is a combination of this electrophoretic motion as well as a subtle but important mechanism involving interfacial-pressure-driven flows (known as chemiphoresis). Both parts depend upon the particle zeta potential, which characterizes the charged nature of the particles.

Prior to the invention diffusiophoresis had not been explored as a mechanism that affects colloidal fouling in a membrane system. In many membrane systems, a gradient of ionic strength is produced either through rejection of solutes at the surface (for e.g., reverse osmosis) or by diffusion of salts between feed and permeate streams (for e.g., dialysis). Solute gradients at the membrane surface (concentration polarization) can lead to a build-up of a gel layer (e.g., of proteins), which reduces flux in diafiltration and hemodialysis[11-13]. In water membrane filtration systems, salt concentration polarization, cake layer build-up and change in ionic strength have been attributed to particle deposition and flux decline[14-17].

The inventions use diffusiophoresis as an active mechanism for particle migration in membrane modules to reduce fouling. The processes and apparatuses of the invention provide new capabilities for controlling and mitigating fouling occurring in membranes during water purification, diafiltration, hemodialysis, fruit juice concentration, ultrafiltration dairy and food applications, protein purification, pressure retarded osmosis power generation, industrial process water treatment, and others.

Provided are processes of reducing or removing particle deposits on a membrane. A process includes placing a membrane in a solvent including charged microparticles that include a salt, acid, base, or combinations thereof. The microparticles are structured and positioned relative to the membrane in the solvent so as to produce a gradient generated spontaneous electric field in the solvent proximal to the membrane. The presence of this gradient generated spontaneous electric field moves charged particles from the membrane into the solution thereby "cleaning" or otherwise renewing the membrane. The process is also optionally used in a prophylactic way so as to prevent the initial contact of charged particles with the membrane.

The processes capitalize on a diffusiophoresis set up by solublization of a salt present in the microparticle in the solvent resulting in an ion gradient that generates a spontaneous electric field in the solvent proximal to the membrane. This electric field is powered by the chemical pump produced by the microparticles to thereby transport charged particles away from the membrane and into the solution.

In some aspects, a microparticle includes one or more salts. Salts include a cation and an anion associated by an ionic bond to produce an essentially neutral substance. Salts operable in the inventions include basic salts, acidic salts, or neutral salts. In some embodiments, a salt is a basic salt in that solubilization in an aqueous solvent will produce hydroxide ions that assist in driving the resulting electric field. In some embodiments, the cation and the anion have different diffusion coefficients in the solvent. Optionally, the anion has a higher diffusion coefficient. Optionally, the cation has a higher diffusion coefficient.

Many salt types are operable in the microparticles used in the inventive processes. Optionally, a salt is a carbonate salt. A carbonate salt is optionally $CaCO_3$, $Na_2CO_3$, $BaCO_3$, $H_2CO_3$, $MgCO_3$, $Li_2CO_3$, $K_2CO_3$ or combinations thereof. Optionally, a salt is a chloride salt. In some embodiments, a salt is KI, NaCl, LiCl, KCl, or combinations thereof. A salt is optionally not calcium chloride. A salt is optionally not potassium chloride.

In some aspects, a salt is an acidic salt. Illustrative examples of acid salts include: bicarbonate salts such as ammonium, calcium bicarbonate; potassium, or sodium bicarbonates; a citrate salt such as calcium or sodium citrates; and phosphate salts such as calcium, magnesium, potassium, or sodium phosphates. In some aspects, a salt is a basic salt. Illustrative examples of basic salts include: carbonates such as calcium, sodium, magnesium, lithium, or potassium carbonates; acetate salts such as sodium acetate; and alkali metal hydroxides; among others. It is appreciated that a salt may include monovalent, divalent, trivalent, or tetravalent component(s).

A salt optionally has moderate solubility in a solvent. Moderate solubility is defined as soluble to 0.5 to 10 mM in the solvent. It is appreciated that higher or lower solubility may be used in some aspects.

In some aspects, a microparticle includes a weak acid or weak base capable of being formed into a solid particle, or otherwise sequesterable to the form of a microparticle.

A microparticle optionally includes any salt, acid, or base that is capable of producing one ion that is faster diffusing than a counter ion and of suitable difference in diffusion coefficient between the two ions to allow the formation of a filed capable of moving foulant(s) from a membrane.

A microparticle is optionally present in a plurality of microparticles. Each microparticle has a diameter. An average diameter for a microparticle is optionally from 10 nm to 100 μm, or larger. In some aspect, an average particle diameter for a microparticle is 100 nm to 100 μm, optionally 300 nm to 100 μm, optionally 500 nm to 100, μm optionally 700 nm to 100 μm, optionally 1 μm to 100 μm, optionally 10 μm to 100 μm, optionally 1 μm to 50 μm, optionally 1 μm to 20 μm, optionally 2 μm to 20 μm. Optionally, an average diameter for a microparticle is optionally from 2 μm to 15 μm. In some aspects, an average microparticle size is less than 1 μm, optionally less than 100 nm, optionally less than 10 nm. Without being limited to one particular theory, it is believed that with increasing microparticle size the effective available solvent exposed surface area/weight of the salt decreases thereby producing a time release system. Other time release systems are similarly suitable as is known in the pharmaceutical arts. In some aspects, a time release system is achieved using small particle sizes, but tailoring other aspects such as porosity of a retaining structure.

A solvent is optionally an aqueous solvent that is 100% or less water. A solvent is optionally water that includes one or more ions, salts, proteins, cells, or other component, or combinations thereof. A solvent optionally contains in a minority concentration an alcohol illustratively an alcohol with 5 or fewer carbons. A solvent optionally has a pH between 2 and 12, optionally 3 to 9, optionally 4 to 8, optionally 6-8.

A microparticle is optionally embedded in a retaining structure, optionally a gel (for example, a hydrogel) or other polymeric (natural or synthetic) matrix. A retaining structure is optionally integral with the microparticle, or the microparticle is embedded or otherwise attached to the retaining structure. A hydrogel is optionally a polyacrylamide hydrogel or a polyurethane matrix that is cross-linked with a poly(ethylene glycol) (PEG) hydrogel. Illustrative examples of hydrogels include organic coatings formed by applying a mixture of an isocyanate, a polyol, polyvinylpyrrolidone, and a carrier to a surface optionally as discussed in U.S. Pat. No. 5,160,790. In some aspects, a hydrogel includes hydroxypropylmethyl cellulose, sodium alginate, xanthan gum, and the like. It is appreciated that other hydrogel types that are capable of or are formed into structures that allow ions to diffuse from the retaining structure are similarly suitable.

I some aspects a retaining structure is in the form of a tablet or capsule, such as in any form commonly used in the pharmaceutical arts. Illustrative examples of a retaining structure optionally include a water soluble polymer, a water insoluble polymer, or combinations thereof. Optionally, a water insoluble polymer is a cellulose ether such as ethyl cellulose, a cellulose ester such as cellulose acetate, methacrylic derivatives available from Rohm Pharma under the trade name "Eudragit™" RL, RS and NE, etc. Optionally, a water soluble polymer is Plasdone S-630 copolyvidonum (ISP technologies), hydrated colloidal silica, sucrose, mannitol or any other substance capable of playing the same role.

In some aspects, a microparticle embedded retaining structure is used as a feed spacer, a surface, or otherwise positioned in a typical filtration system proximal to a membrane filter. In some aspects, a feed spacer is formed of a hydrogel with embedded microparticles. In some aspects, a feed spacer is a polyacrylate material with embedded microparticles. It is appreciated that any polymeric material that can be formed into a fluid transmissible system is operable. Optionally, a feed spacer is in the form of a mesh. Optionally, a feed spacer is not fluid transmissible, but is placeable a distance from a membrane where raw fluid flow moves between the microparticles containing material and the membrane and the positioning of the microparticles to the membrane provides for generation of a spontaneous electric field or a gradient generated spontaneous chemiphoretic field proximal to the membrane so as to remove deposits from the membrane.

A retaining structure is optionally formed of a polymeric (natural or synthetic) matrix. Such materials are optionally aminoplasts, melamine formaldehydes, carbamates, polyurethanes, polyacrylates, epoxies, polycarbonates, alkyds, vinyls, polyamides, polyolefins, phenolic resins, polyesters, polysiloxanes; and combinations of any of these or other polymers.

In some embodiments, a polymeric material is crosslinkable. Illustratively, a crosslinkable polymer has a functional group characteristic of a crosslinkable polymer. Examples of such functional groups illustratively include acetoacetate, acid, amine, carboxyl, epoxy, hydroxyl, isocyanate, silane, vinyl, other operable functional groups, and combinations thereof.

Examples of organic crosslinkable polymer resins include aminoplasts, melamine formaldehydes, carbamates, polyurethanes, polyacrylates, epoxies, polycarbonates, alkyds, vinyls, polyamides, polyolefins, phenolic resins, polyesters, polysiloxanes, or combinations thereof.

A cross linking agent (crosslinker) is optionally included in the polymeric matrix. The particular crosslinker selected depends on the particular polymer used. Non-limiting examples of crosslinkers include compounds having functional groups such as isocyanate functional groups, epoxy functional groups, aldehyde functional groups, or acid functionality. In some aspects, a polymer is a hydroxyl-functional acrylic polymer and the crosslinker is a polyisocyanate.

The process is optionally used with any type of membrane. In some embodiments, a membrane is neutral or negatively charged. Illustrative membrane types include, but are not limited to polyamide, cellulose acetate, polysulfone, polyethersulfone, polypropylene, polycarbonate, polyvinylidene difluoride (PVDF), polytetrafluoroethylene (PTFE), or combinations thereof.

The processes can be used to move any particle away from a membrane surface. A contaminating particle is optionally negatively charged, positively charged, or neutral. Illustrative examples of a contaminating particle include but are not limited to colloidal particles, cells, charged ions, neutral particles, charged particles, dust, viruses, or other particle (including microorganisms) known in the art to collect on a filtration membrane.

A microparticle is positioned relative to a membrane in the solvent so as to produce a gradient generated spontaneous electric field or a gradient generated spontaneous chemiphoretic field in the solvent proximal to the membrane. Such fields are produced with sufficient field strength when a microparticle is positioned at or within 1000 μm from the membrane. In some aspects, a microparticle is positioned at or within 900 μm from the membrane, optionally 800 μm, optionally 700 μoptionally 600 μm, optionally 500 μm, optionally 400 μm, optionally 300 μm, optionally 200 μm, optionally 100 μm, optionally 90 μm, optionally 80 μm, optionally 50 μm, optionally 40 μm, optionally 300 μm, optionally 20 μm, optionally 10 μm, from the membrane. Proximal positioning is optionally at least 2× the distance from the membrane as the size (linear dimension) of the foulant (e.g. particle) being removed from the membrane so as to provide sufficient fluid flow behind the microparticle.

The choice of microparticle location relative to the membrane and microparticle type (e.g. salt type) is tailored to work in concert. As a non-limiting illustration, in an aspect where a membrane is a negatively charged polyamide membrane, placing a salt with an anion with a higher diffusion coefficient relative to the cation at a location adjacent to but not in contact with the membrane will produce a gradient generated spontaneous electric field between the microparticles and the membrane that pulls negatively charged particles away from the membrane. Locating a salt with a cation that has a higher diffusion coefficient on the membrane will also result in a gradient generated spontaneous electric field between the microparticles and the membrane that pulls positively charged particles away from the membrane. One of skill in the art can use the present disclosure to choose membrane type, salt type, and microparticle placement to achieve the desired result in the solvent. In this way, diffusiophoresis is used in the inventive processes as an active mechanism for particle migration in membrane modules.

A microparticle is optionally positioned relative to a membrane for a treatment time. A treatment time is a time sufficient to prevent deposition of a foulant or other undesirable deposit on a membrane, or for removal of at least a portion of the foulant or other deposit from the membrane. A treatment time is optionally 1 hour or greater, optionally 2, 3, 4, 5, 6, 12, 24, or more hours. A treatment time is optionally 1 day, optionally 2, 3, 4 or more days. A treatment time is optionally the time it takes the salt, acid, or base in the microparticle to establish an equilibrium in the solvent or otherwise become unavailable such that the electric filed is no longer present or no longer effective.

Figure 2A:
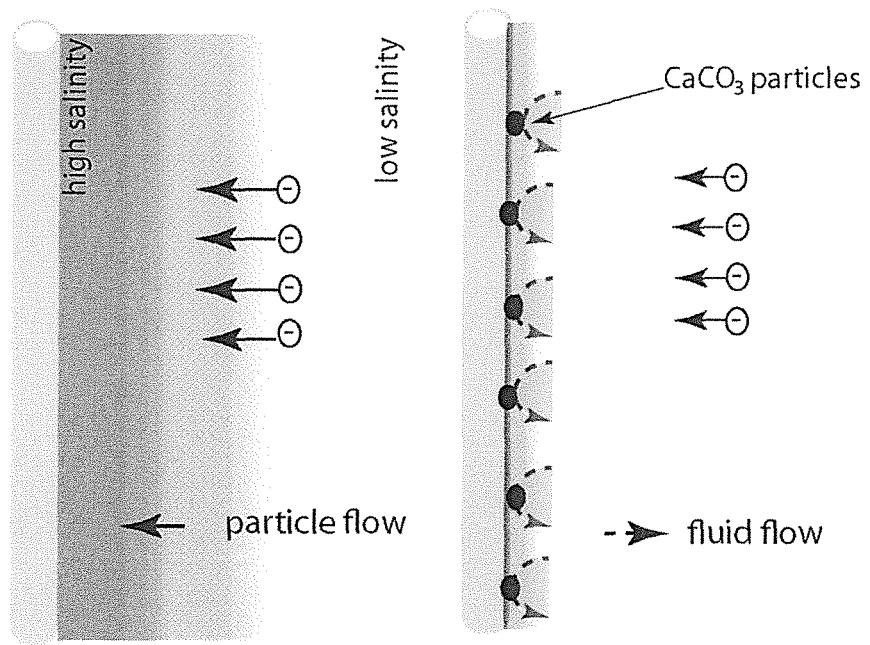
FIG. 2A illustrates RO membranes can have high concentration polarization (left) where imposing circulating flows at the surface or vicinity of membranes by introducing a microparticle of sparingly soluble salt (such as $CaCO_3$) can prevent buildup of particles and disrupt concentration polarization.
Figure 2B:
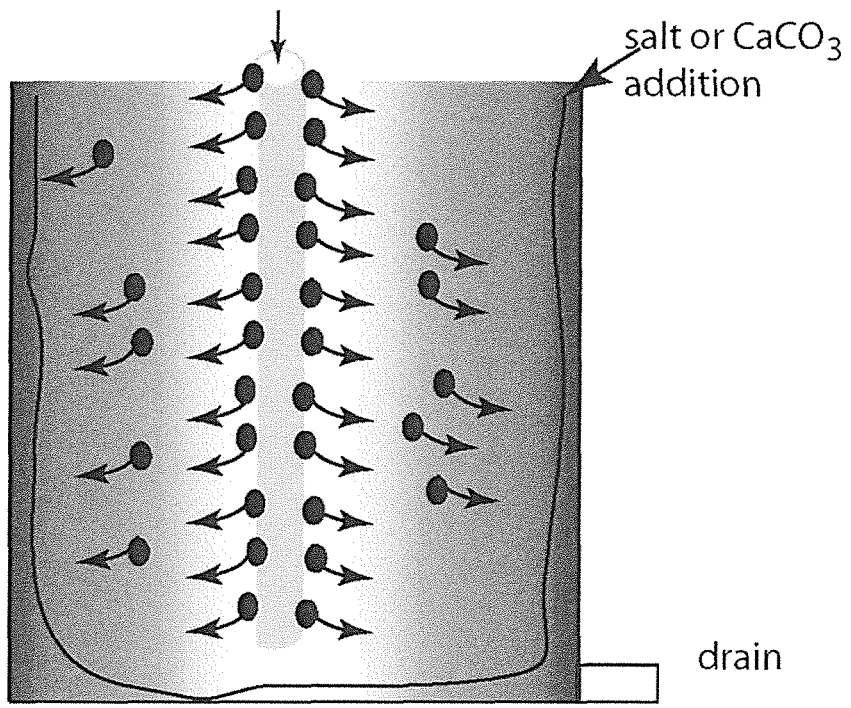
FIG. 2B illustrates a schematic of how fouled membranes (e.g. MF or UF hollow fiber) are back washed by pumping purified water in reverse flow through the fiber (inside out) and using air scour (blowers) periodically (every ½ hr-4 hours) as is historically performed to clear a membrane.

Without being limited to one particular theory, the invention counters diffusiophoresis that contributes to particle deposition and membrane fouling (FIG. 2) in the presence of a salt gradient. The invention is also used as a chemiphoretic technique that can be used with neutral solutes. As shown in FIG. 2A, membranes can have high concentration polarization. Flows at the surface or in the vicinity of membranes by introducing granules of sparingly soluble salts (such as $CaCO_3$) can prevent build-up of particles and disrupt concentration polarization. Prior methods to clean fouled MF or UF hollow fiber membranes backwash the membranes by pumping purified water in reverse flow through the fiber (inside out) and using air scour (blowers) periodically (every ½ hr-4 hours). The inventive processes, in contrast, introduce a salt gradient by adding a dilute salt solution to the membrane tank to induce diffusiophoretic transport of deposited particles. Osmotic water flow towards tank walls may also assist in driving particle transport away from the membrane.

Using $CaCO_3$ microparticles or other salt gradient generating systems placed near the membrane can enhance mixing and thus reduce concentration polarization as well as particle deposition in high pressure salt rejecting membrane systems. By using $CaCO_3$ or a salt feed in membrane tanks during the backwash period in low-pressure (microfiltration (MF) and ultrafiltration (UF)) membrane operation, particles can be pulled off from the membrane surface. This will reduce the amount of cleaning chemicals, power and pure water used during conventional backwash and chemical wash operations. By using this salt-gradient driven maintenance step, the inventions replace the common ways of particle removal like air scour and water backwash.

The processes have numerous uses such as: immobilized microparticles (e.g. $CaCO_3$) in controlled release configurations in salt rejecting systems as turbulence promoters and particle collectors; or for simple $CaCO_3$ or salt feed systems on the edges of submerged membrane tanks on timers similar to that on backwash systems.

The processes may be used in inventive apparatuses or systems employing materials of the process. Optionally, a membrane cleaning system is provided that includes a container or surface that includes a microparticle used in the inventive processes.

The processes, systems, and apparatuses have numerous advantages including easy integration into current membrane systems, the requirement for only minor changes needed to membrane module and system design, and no environmental or health risk to use of proposed materials (due to small amounts of environmentally and health benign $CaCO_3$ (in some embodiments) involved in cleaning step).

Various aspects of the present invention are illustrated by the following non-limiting examples. The examples are for illustrative purposes and are not a limitation on any practice of the present invention. It will be understood that variations and modifications can be made without departing from the spirit and scope of the invention.

EXAMPLES

Example 1

Reagents: A transient salt gradient was generated by using the approach of filling a single 13 kDa hollow fiber membrane (HFM) with a salt solution and letting it diffuse out over time. The salt solution was made with lithium chloride (LiCl), sodium chloride (NaCl) and potassium chloride (KCl), all obtained from Sigma Aldrich. Various concentrations of these salt solutions were prepared using de-ionized (DI) water obtained from a Millipore Corporation Milli-Q system, with a specific resistance of 1 MΩ·cm (due to equilibration with $CO_2$ in air).

$CaCO_3$ microparticles were synthesized for experimental purposes using sodium carbonate ($Na_2CO_3$) and calcium chloride ($CaCl_2$), which were also obtained from Sigma-Aldrich. Lucigenin dye (mol. weight 511) (Invitrogen Molecular Probes (Eugene, Oreg.)) was used to map gradient intensity of chloride ions in the system. Colloidal sulfated polystyrene latex (sPSL) particles ($\phi$=3.0 μm±2.1%, w/v=8%) used for observing transport under salt gradient were procured from Interfacial Dynamics Corporation (Portland, Oreg.). Red fluorescent sPSL microspheres ($\phi$=4.0 μm±2.0%, w/v=2%, ex/em=580 nm/605 nm) were also used for some confocal microscopy experiments. Borosilicate glass square capillaries of 0.9 mm size (part #8290-050) were obtained from Vitrocom (Mountain Lakes, N.J.).

Calcium carbonate microparticle synthesis: Calcium carbonate microparticles were used to mitigate fouling in membrane systems by acting as "diffusioosmotic micropumps." The particles were synthesized using a route described by Volodkin et al., Langmuir, 2004; 20:3398-3406. As examined by optical microscopy, the $CaCO_3$ microparticles were roughly spherical with an average radius of 7~10 μm. These microparticles act as micropumps in a DI water solution containing negatively charged sPSL tracer particles due to an enhanced diffusiophoretic effect.

Salt gradient in a closed system: Salt gradients were set up by placing a HFM inside of a 1 mm or 0.9 mm square capillary. A single regenerated cellulose microdialysis hollow fiber membrane (HFM) was used that had a 280 μm outside diameter (OD) and 40 μm wall thickness for each of our experiments. HFM fibers were obtained from Spectrum Labs, Rancho Dominguez, Calif. Each HFM was washed with ethanol using one ml syringes (BD Biosciences) fitted with a 21 G precision needle before use. HFM was then washed again with 10 mM NaCl (or 10 mM KCl or 10 mM LiCl), loaded with 10 mM NaCl and both ends of the hollow fiber were sealed with wax. The sealed HFM was inserted into either a 0.9 mm or 1 mm square glass capillary (Vitrotubes). The capillary surrounding the HFM was filled with DI water containing suspended sPSL particles (<0.1% v/v), mounted on a VWR glass microslide (25 mm $^{33}$ 75 mm) and closed at both ends with paraffin wax. Sealed HFMs were used to avoid convective motion across the fiber bore, so that diffusion of ions across the wall was the only way through which charged particles could sense the salt gradient. For observing the motion of tracers in response to $CaCO_3$ micropumps, the $CaCO_3$ microparticles were placed inside the glass capillary which contained the tracer particles.

Figure 3A:
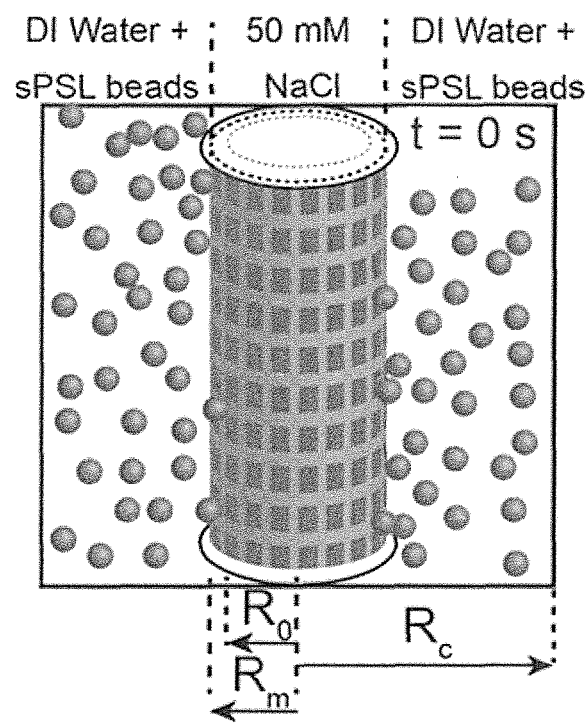
FIG. 3A illustrates an exemplary system wherein salt-gradients induce particle deposition and chemical micropumps (microparticles including a salt) mitigate this effect where 50 mM NaCl was concentrated in HFM at t=0 s, while outside solution contained sPSL ($\phi$=3.0 μm±2.1%, w/v=8%) particles in DI.

Particle deposition was tested with salts of different concentrations using the HFM setup. FIG. 3 is a schematic of the experimental set-up. HFMs were filled with 50 mM NaCl salt solution, then closed at all openings, and placed inside a capillary containing DI water (or the same salt with concentration <50 mM). The DI water outside the HFM contained negatively charged sPSL tracer particles (FIG. 3A).

Both an inverted light microscope and a confocal microscope were used to image the systems. Brightfield observation of particle motion was made on a Nikon inverted microscope (Eclipse TE2000-U) fitted with an optical light source and CCD camera (Q-Imaging). Nikon NIS Elements Imaging Software (V. 4) was used for particle velocity measurements and tracking. A Leica TCS SP5 laser scanning confocal microscope (LSCM, Leica Microsystems) was used for dye imaging and experiments with fluorescent particles. Observations were made at 10× magnification for most cases. Image intensity profiles were analyzed using ImageJ software (National Institutes of Health).

Figure 3B:
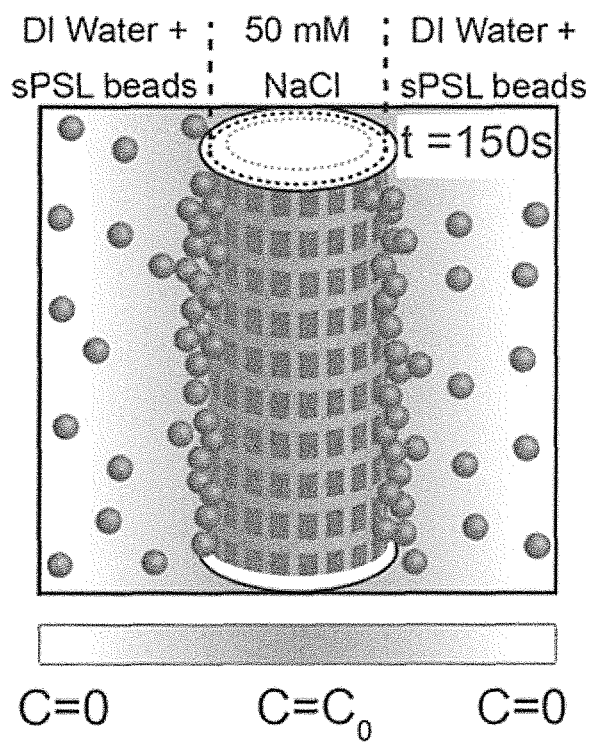
FIG. 3B illustrates the exemplary system at t=150 s, under the influence of NaCl gradients where over this time period considerable deposition of particles on HFM wall was observed.
Figure 3C:
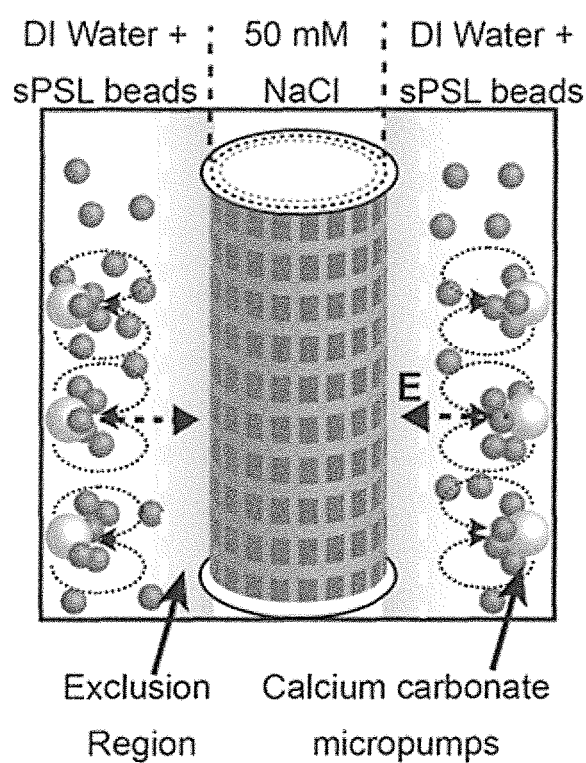
FIG. 3C illustrates the exemplary system demonstrating that calcium carbonate micropumps prevented the particle deposition illustrated in FIG. 3B.

Due to the high ionic gradient near the HFM, rapid deposition of particles onto the membrane surface was observed (FIG. 3). Because of the setup time for the experiments, which is typically at least 2 minutes, we were unable to see the initial motion of tracers towards the membrane surface. However, for t>150 s, distinct layers of particle aggregation are observed on the membrane surface (FIG. 3B). This physical deposition onto the membrane surface occurs without any external pressure or applied electric field. The chemical energy of the salt gradient is transduced into directed diffusiophoretic transport of the colloidal particles, which results in particle deposition along the membrane surface. However, by using chemical micropumps, in the form of calcium carbonate microparticles, colloidal deposition can be reduced or even reversed on the membrane surface especially if the micropumps are immobilized close to the surface of the HFM (FIG. 3C). The use of $CaCO_3$ reverses the direction of the diffusiophoresis resulting in clear exclusion zones of colloidal particles near the surface of the membrane that grow over time resulting in complete mitigation of particle deposition. Such an auto-electrokinetic effect observed from dissolving minerals, will serve as a motivation for improved designs of hollow fiber modules used in water purification processes in order to disrupt concentration polarization and fouling effects.

Figure 4A:
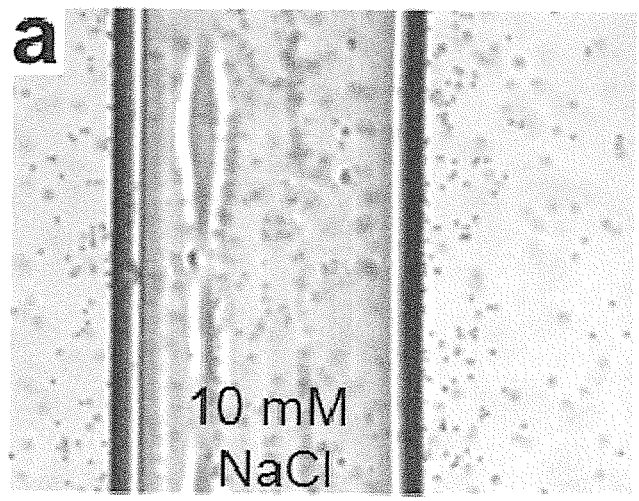
FIG. 4A illustrates particle migration under a transient salt gradient due to diffusiophoresis where a transient salt gradient was established with 10 mM NaCl inside the HFM and 3.0 μm sPSL in DI in the capillary where at t~2 mins, sPSL beads are seen to be "concentrated" along the wall of the HFM.
Figure 4B:
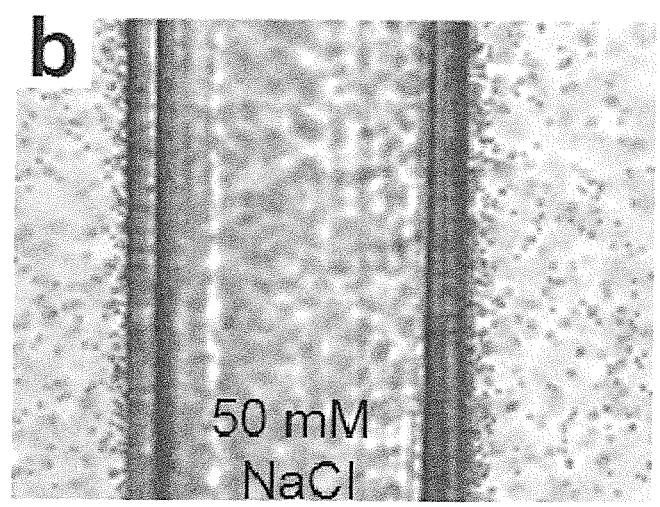
FIG. 4B illustrates particle migration under a transient salt gradient due to diffusiophoresis where a transient salt gradient was established with 50 mM NaCl inside the HFM and 3.0 μm sPSL in DI in the capillary where at t~2 mins, sPSL beads are seen to be "concentrated" along the wall of the HFM to a greater extent with the higher salt concentration relative to FIG. 4A.

In the exemplary system, a temporal concentration gradient was set-up across the membrane surface due to a finite source (salt solution) and a finite sink (DI water). The time-dependent and spatially non-uniform salt gradient set up transport of particles towards the higher salt regime is illustrated in FIG. 4. At a higher NaCl concentration inside the HFM, enhanced particle deposition was observed on the outside wall of the HFM. The deposition thickness increased when the inside salt concentration was changed from 10 mM NaCl (FIG. 4A) to 50 mM NaCl (FIG. 4B).

To account for possible deposition effects induced due to gravitational settling, we switched to a vertical set-up of the HFM. Using the same configuration (50 mM NaCl inside the HFM and DI water with particles outside) in a vertical and horizontal setup, the degree of aggregation was observed to be indistinguishable demonstrating negligible effect on particle deposition by gravity or osmotic gradients.

Our experimental set-up allowed for the isolation of the effect of diffusiophoresis from pressure or osmotic gradient-driven flows that could possibly dominate in conventional membrane testing setups.

Development of transient salt gradient: Since the membrane had a large molecular weight cut-off (MWCO=13 KDa) compared to the salt solutes used, the solutes diffuse through the membrane surface out into the bulk. With the salt solution inside the HFM and DI water containing tracers outside, a transient salt concentration gradient is set up (dn/dt≠0) that is also spatially non-uniform (dn/dr≠0). The transient effect was modeled using Fick's second law in cylindrical coordinates with the assumption that the Debye lengths in our system are infinitesimally small, by solving Eqn. 3

$$\frac{\partial N(r,t)}{\partial t} - D^*\left(\frac{\partial^2 n(r,t)}{\partial r^2} + \frac{1}{r}\frac{\partial n(r,t)}{\partial r}\right) = 0 \quad (3)$$

where $D^*=2D_+D_-/(D_++D_-)$ is the effective diffusion coefficient for a Z:Z symmetric electrolyte due to electroneutrality in the system. The rigorous explanation for using $D^*$ is reviewed by Anderson[6]. The initial conditions are $n(0,r)=n_0$ for $r<R_m$ and 0 for $r≥R_m$. The flux of ions at the center of the HFM and at the capillary wall surface set to zero to form our boundary conditions.

Figure 5:
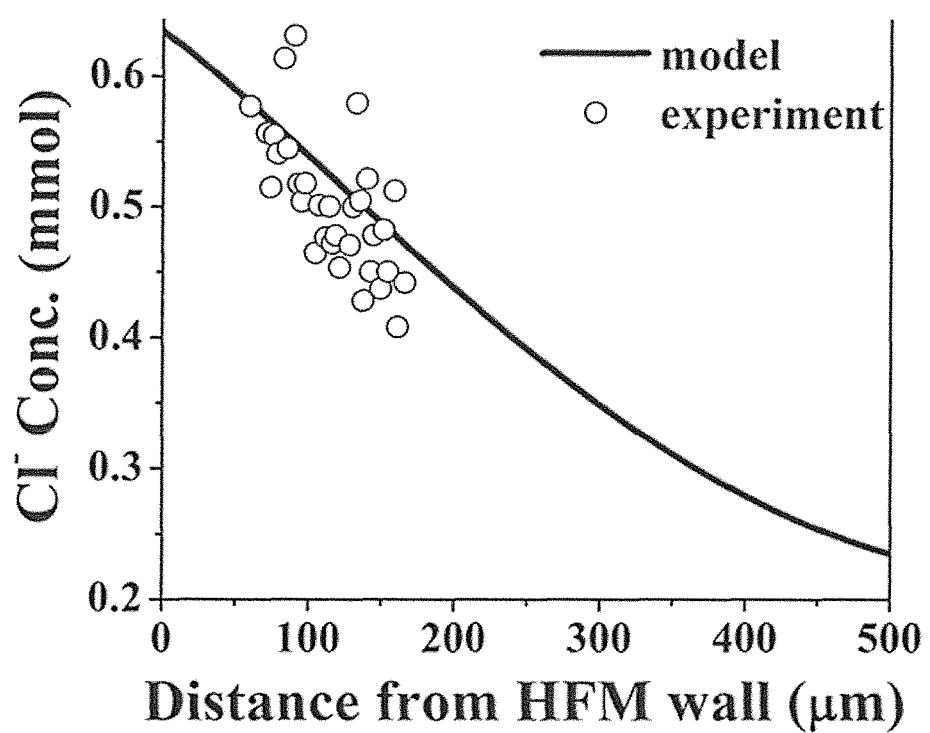
FIG. 5 illustrates a comparison of experimental data for salt gradient plotted along with that predicted from model for t=1 min where the gradients decayed linearly away from the wall of the HFM.

The experimental model was compared with experimental concentration profiles as illustrated in FIG. 5. In order to measure the Cl$^-$ concentration in our system we used a fluorescence quenching based measurement technique[19]. We used the fluorescent probe, lucigenin which is commonly used to detect superoxide but is also known to be quenched by halide ions and has been employed in assays to detect chloride transport using biological transporters. With restricted illumination from the confocal microscope, we standardized our intensity profile obtained from Lucigenin using the Stern-Volmer equation (Eqn. 2) for various concentrations of Cl[31] in the system.

$$F_0/F_{Cl^-} = 1 + K_{Cl^-}[Cl] \quad (2)$$

Here, $F_0$ is the fluorescence intensity in the absence of Cl$^-$, $F_{Cl^-}$ is the fluorescence intensity in the presence of varying concentration of Cl$^-$, $K_{Cl^-}$ is the Stern-Volmer constant and [Cl] is the concentration of the salt. By plotting $F_0/F_{Cl}$ for various values of [Cl], we obtained $K_{Cl^-}$ to be 365 mM$^{-1}$ which was then used to find the concentration of Cl$^-$ at various measured intensities.

After proper calibration, fluorescence intensities were measured at different distances away from the wall of the HFM and plotted as shown in FIG. 5. The experimental results showed a good fit to the modeling predictions. The sidewalls of the capillary posed experimental difficulties when we sought to measure the fluorescence intensity near the surface yet the experimental data matches the model within 200 μm of the HFM wall.

Generation of Electric field: The transient salt gradient gave rise to a spontaneous electric field $E=[kT/Ze][(D_+-D_-)/(D_++D_-)]\nabla n/n$ in the system. This occurs due to the difference in diffusion coefficients of the constituent ions, since, a Na$^+$ ($D_{Na}^+$=1.334×10$^{-9}$ m$^2$/s) diffuses slower than a Cl$^-$ ion ($D_{Cl^-}$=2.032×10$^{-9}$ m$^2$/s). Difference in diffusion coefficients are quantified by β, where $β=(D_+-D_-)/(D_++D_-)$. In cases where the diffusion coefficients of the ions don't differ by significantly (e.g. in case of KCl, $D_{K^+}≈D_{Cl^-}$=2.032×10$^{-9}$ m$^2$/s), β≈0, the electrophoretic part of Eqn. 1 vanishes and the transport is only caused by chemiphoresis. As expected, the particles move at a much slower rate than observed in case of NaCl (where β≈−0.207).

Diffusiophoretic speeds: Proper quantification of zeta potentials (ζ) and salt gradients in the system enables perfect prediction of the rates of transport of tracers towards the membrane surface. For zeta potential (ζ) measurements of sPSL tracers (both fluorescent and non-fluorescent), a Zetasizer Nano ZS90 (Malvern, Mass., model ZEN3690) was used. The ζ potential of the particles was measured at 298 K using disposable cuvettes (DTS1061) at ionic strengths of 0.1-100 mM salt concentration and pH of 5.8. Zeta potential of the membrane was not critical to the observations as tracer velocities were measured away from the membrane.

Figure 6A:
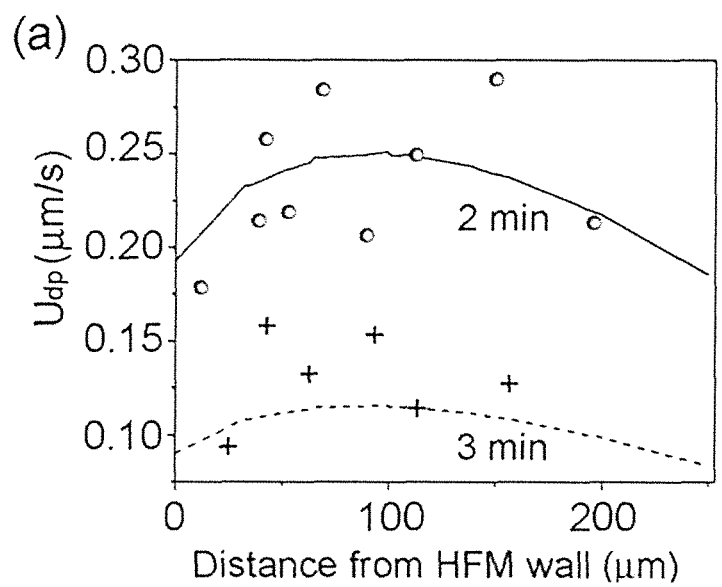
FIG. 6A illustrates modeled and measured diffusiophoretic speeds of sPSL particles due to a gradient of NaCl in one experimental system where diffusiophoretic particle velocities ($U_{dp}$, μm/s) decrease with time and change with distance as measured and modeled for 10 mM NaCl inside HFM/3 μm sPSL particles in DI outside at t~120 s and t~180 s in 1 mm ID capillary.

FIG. 6 illustrates modeled and measured diffusiophoretic speeds of sPSL particles due to a gradient of NaCl. Salt gradient induced by 10 mM NaCl inside the HFM caused particle migration towards the wall with measured speeds in the range of ~0.1-0.3 μm/s after 2-3 minutes. Particle speeds decrease with time as $\nabla n/n$ becomes smaller. Initially, when the gradient has not dissipated, diffusiophoretic speeds are estimated to be in the range of 10's of μm/s. The observed speeds are relatively low compared to convective velocities in membrane systems, however, the gradients utilized here are small and transient.

In modeling the system, inside and outside diffusivities are assumed as solute diffusivity in water. Diffusivity through the membrane was calculated using capillary pore diffusion model accounting for the Stokes radius of each ion[26]. The concentration dilution outside HFM was observed with lucigenin, which also supported modeled concentration in bulk region of capillary devoid of wall effects.

Figure 6B:
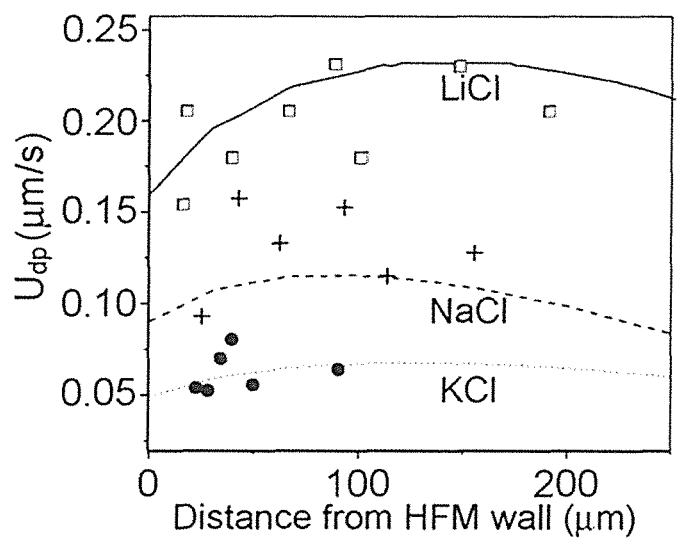
FIG. 6B illustrates that $U_{dp}$ depends on nature of salts as measured and modeled for 10 mM NaCl, 10 mM KCl or 10 mM LiCl inside HFM/3 μm sPSL particles in DI outside at t~180 s in 1 mm ID capillary (for NaCl & KCl) and 0.9 mm ID capillary (for LiCl)

FIG. 6B compares diffusiophoretic speeds of sPSL at t~3 min in presence of LiCl, NaCl and KCl gradients, each present inside HFM at 10 mM initial concentration. Since $Li^+$ ions have lower diffusion co-efficient than $Na^+$ ions ($D_{Li^+}=1.03\times10^{-9}$ m$^2$/s and $D_{Na^+}=1.334\times10^{-9}$ m$^2$/s) and thus $\beta_{LiCl}>\beta_{NaCl}$, a stronger electric field is generated (~0.8 V/m for LiCl and ~0.45 V/m for NaCl). On the other hand, $K^+$ ions have comparable ion diffusivity as that of $Cl^-$, which leads to relatively weak electric field of the order of ~0.035 V/m and subsequent sPSL tracer movement mainly through chemiphoretic mechanism with half the speed of the NaCl case. Experimental measurements are corroborated by system modeling of diffusiophoretic velocity profiles, both spatiotemporally (FIG. 6A) as well as with different salts (FIG. 6B).

Presence of $CaCO_3$ micropumps: The behavior of particle transport was seen to be altered by changing the positioning of salt in the system. This effect was most evident when we used $CaCO_3$ micropumps outside HFM in the bulk region of capillary, which completely reversed the motion of tracers in a NaCl gradient (FIG. 7). The difference between effects of calcium carbonate and sodium chloride results in particle motion towards the dominant species in the system i.e. $CaCO_3$ micropumps. Since the gradient of NaCl dies down rapidly to a more stable value, the system functions similar to a gradient emanating from a single source.

Reversing the electric field created by a salt gradient using dissolving $CaCO_3$ in the bulk solution can prevent or reverse particle deposition. $CaCO_3$ dissolution generates $OH^-$, $HCO_3^-$, and $Ca^{2+}$ ions with considerable diffusivity differences ($D_{OH^-}=5.27\times10^{-9}$ m$^2$/s, $D_{HCO_3^-}=1.19\times10^{-9}$ m$^2$/s and $D_{Ca^{2+}}=0.792\times10^{-9}$ m$^2$/s) sufficient to generate a stronger electric field than NaCl owing to the high diffusion coefficient of the hydroxyl ion. When $CaCO_3$ microparticles are kept on the outside surface of the HFM, an electric field is developed towards the membrane and opposite to that generated by the NaCl. This reverse electric field in conjunction with lower $\zeta_p$ (−67.9 mV) in presence of $CaCO_3$ reduces tracer speeds and eventually removes particles from HFM surface creating an exclusion zone (FIGS. 7A and B).

The $CaCO_3$ particles (schematically illustrated in FIG. 7A) create an exclusion region of tracer particles (FIG. 7B) next to the membrane surface. This observation indicates reduction or reversal of particle deposition by controlling the direction of the diffusiophoresis in the system. FIGS. 7C and D are time lapse images showing how particle aggregation near to HFM is affected with time in presence of 0.1 mM $CaCO_3$. The resultant electric field in NaCl—$CaCO_3$ system does not allow particle deposition on the membrane. The particles remain stable or relax at a certain distance from the membrane wall (exclusion zone) and slowly move out towards capillary wall (FIG. 7D). Without being limited to one particular theory, this is likely because of a resultant opposite electric field.

Particle deposition onto membranes causes fouling, and is thus a bottleneck in many membrane processes. These data demonstrate that particle deposition occurs not only due to a filtration effect, but also due to a diffusiophoretic transport effect. A system with induced salt gradients across the wall of a microporous hollow fiber membrane was investigated and it was observed that particle deposition is enhanced by the mechanism of diffusiophoresis. By measuring and modeling all the required parameters (zeta potential, concentration gradient and diffusion coefficients) in the system it was observed that modeled speeds matched experimental results. With an understanding of the role of this mechanism, we were successful in reducing particle deposition using $CaCO_3$ micropumps. These inventive processes and apparatuses further our understanding of particle deposition in membrane systems in the presence of salt gradients and provide ways of mitigating excessive particle deposition and accompanying flux decline.

Example 2

Antifouling of Reverse Osmosis (RO) Membranes:

Flux decline experiments with silica colloids were performed under identical conditions but with different electrolytes (LiCl, NaCl and KCl) finding significant differences in permeate flux decline that cannot be explained by the simple diffusivity differences in these salts or differences in electrostatic interactions between the colloids and the membrane.

High salt rejecting seawater desalination RO membranes (99.6%) were used for to minimize artifacts from solute passage. Flat sheet sea water desalination membranes (DOW SW30HR), obtained from Dow Water and Process Solutions (DWPS), were used for all RO experiments. These membranes were supplied as rectangular sheets and were cut to fit the membrane cell dimensions (9.5 cm×14.5 cm) of the experimental system. Colloidal silica particles of 80 nm mean diameter, Snowtex-ZL (lot no. 250612) supplied by Nissan Chemical America Corp., Houston, Tex.), were used in the flux decline experiments. 3 μm sulfate polystyrene latex (spsl, 8% w/v, lot no. 1459571) from Molecular Probes (Life Technologies, Grand Island, N.Y.) were also used as foulants in some flux decline experiments. Electrolyte salts—LiCl (lot no. SLBD4515V), NaCl (lot no. 49H0264) and KCl (lot no. SLBF1729V)—were purchased from Sigma-Aldrich (St. Louis, Mo.). Deionized water was obtained from Barnstead Nanopure (Model 7146) system from Thermo Scientific (Marietta, Ohio).

For RO experiments a bench-scale RO crossflow system with automated control and data acquisition system was built around a GE Osmonics SEPA® CF membrane element cell (Sterlitech corp., Kent, Wash.). Feed solutions containing colloidal particles as foulants were fed through a Baldor Reliancer Super-E motor pump (Baldor Electric Co., Fort Smith, Ark.). The pump inlet pressure was monitored using a pressure transducer (1-5 V DC, 4-20 mA output) from Ashcroft (Stratford, Conn.) and controlled by National Instruments NISCB-68A DAQ accessory (Austin, Tex.). The controller and transducer were powered by a programmable DC power supply (model no. 382280, Extech instruments, Waltham, Mass. 02451). A Commander SK module (Emerson, Eden Prairie, Minn.) was used as AC pump drive and was controlled by the DAQ system. A 6000 series portable chiller from Polyscience Corp. (Niles, Ill.) was used to keep the feed temperature at a set value of 20° C. Feed and permeate conductivities were measured using an Orion Versastar conductivity meter (model VSTAR 50) from Thermo Scientific. Feed turbidity was measured by a 2100P turbidimeter from Hach (Loveland, Colo.). The permeate water flow rate was measured by an electronic weighing balance (GF-3000) from A & D (Bradford, Mass.) and recorded with RsWeight Ver. 1.00 software on a desktop computer. All pressure controls were input and monitored through LabView software (National Instruments). A needle valve from Swagelok (Model no. 709283001) was placed at the concentrate outlet and used to maintain the pressure in the RO chamber. Conductivities and turbidities were measured manually at different time intervals. For zeta potential ($\zeta_p$) measurements of silica and polystyrene latex, a Zetasizer Nano ZS90 (Malvern, Mass., model ZEN3690) instrument was used. The $\zeta_p$ of the particles were measured at 298 K using disposable cuvettes (DTS1061) in 20 mM concentrations of the respective salts and at a pH of 5.8. Table 1 lists the value of β for several salts, calculated values for the CP factor, maximum E field within the cake, and the average cake growth rate measured.

TABLE 1

Relevant Salt Dependent Cake Parameters (at 23 liters per square meter per hour (LMH) flux, 20 μm cake layer and 0.5 cake porosity for 80 nm silica nanoparticles)

| Salt | $\zeta_p$ (mV) | Concentration Polarization factor within cake | $\beta$ $\frac{(D_+ - D_-)}{(D_+ + D_-)}$ | Maximum E within cake (V/m) | Average Cake Growth Rate (m/s) |
|---|---|---|---|---|---|
| LiCl | −41.3 | 3.2 | −0.327 | −184 | $3.0 \times 10^{-8}$ |
| NaCl | −33.0 | 2.8 | −0.207 | −99 | $2.5 \times 10^{-8}$ |
| KCl | −28.9 | 2.4 | −0.018 | −6.9 | $1.3 \times 10^{-8}$ |

Experimental Procedure

Three different salts were used in the RO experiments: LiCl, NaCl, and KCl. These are expected to give quite different diffusiophoretic (DP) effects. The membrane was compacted for 24 h at 400 psi and 19° C. before charging any salt. Then 20 mM salt (LiCl, NaCl or KCl) was added to condition the membrane for a further 12 h. Finally, 0.017% (w/v) colloidal particles in the 20 mM salt were added to the feed tank and constant pressure flux decline experiments ere begun. The feed charge volume was 4 liters and concentrate and permeate were recycled back to the feed tank. The experiments were run for 10 h to 3 days at constant pressure and relevant parameters were recorded.

Figure 8:
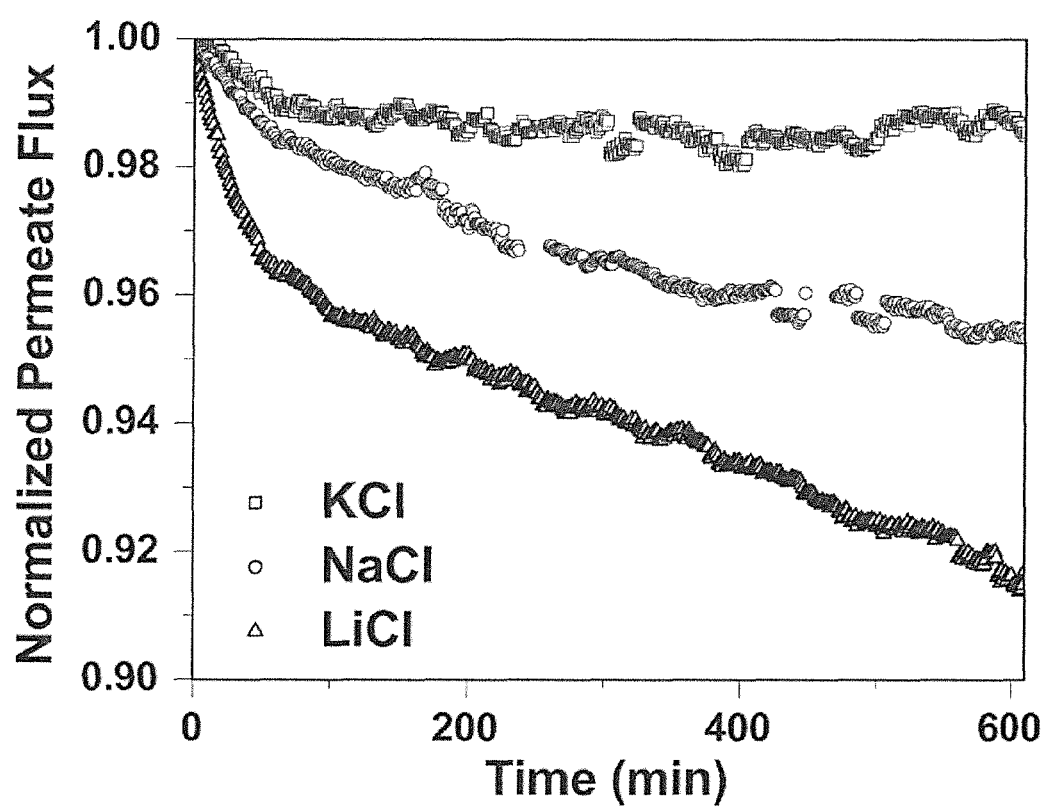
FIG. 8 illustrates flux decline of RO membranes due to colloidal fouling in electrolytes containing different salts as explained using the phenomenon of DP.

Several constant pressure RO experiments were performed keeping hydrodynamic conditions the same. Silica colloids (0.017% w/v, 80 nm) were used as model foulants suspended in 20 mM electrolyte solutions (LiCl, NaCl and KCl). In each case, permeate water flux was tracked over time under constant 400 psig pressure. The permeate flow rates in the experiments with different 20 mM salt solutions were 4.3±2.3% g/min corresponding to a flux of 18.7 LMH±2.3%. The flux data are shown in FIG. 8, with the values normalized by the initial flux. 20 mM LiCl gave highest flux decline followed by NaCl and then KCl under similar conditions in RO. The β values of these salts are in the order LiCl>NaCl>KCl and are directly proportional to the flux decline in accordance with diffusiophoresis driven enhancement in particle deposition and flux decline. Permeate flux did not change significantly in 600 min in case of KCl, but continuously decreased in case of NaCl and even more for LiCl with silica particles (80 nm silica, 0.017 wt %) as foulants. Average initial fluxes were 19.1, 18.3 and 18.7 LMH for LiCl, NaCl and KCl, respectively. The flux decline with KCl was minimal, with the flux remaining within 2% of the initial flux throughout the 600 min experiment. A much larger flux decline was seen with LiCl, with data for the NaCl falling between the results for LiCl and KCl. The magnitude of the flux decline for the different salts was directly proportional to the β values of the electrolytes (Table 1), which is attributed to the differences in DP and the corresponding difference in particle deposition and subsequent flux decline.

Modeled Cake Enhanced Concentration Polarization was Different for Different Salts.

Figure 9A:
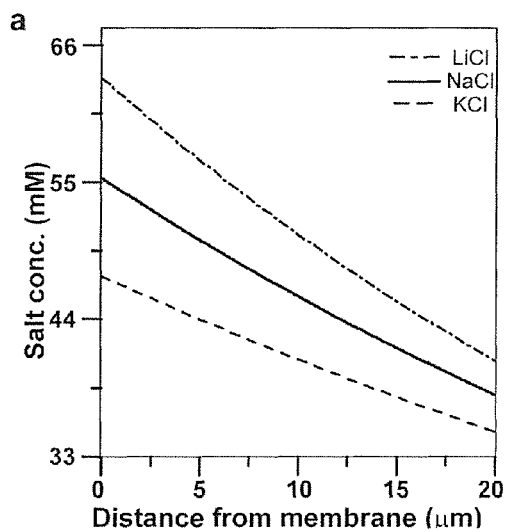
FIG. 9A illustrates the calculated concentration profile within 20 μm of the membrane surface (within the cake layer) for an experimental RO system demonstrating that the membrane surface concentration of salt becomes 3.16 times the bulk concentration due to hindered back diffusion in the cake layer for LiCl, 2.76 times for NaCl and 2.37 times for KCl in accordance with CECP theory.
Figure 9B:
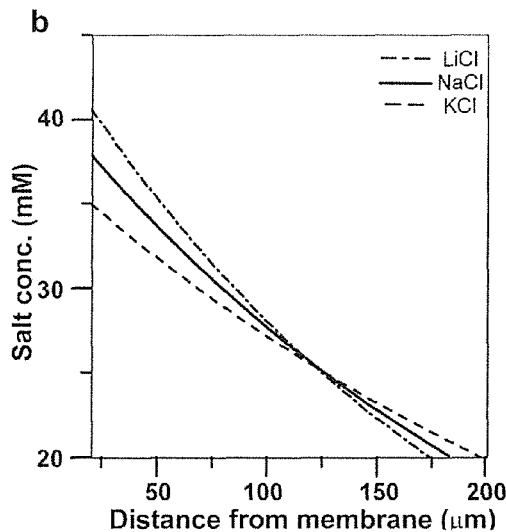
FIG. 9B illustrates the concentration profile outside of 20 μm from the membrane surface of the concentration boundary layer in an experimental system demonstrating that the concentration steadily decreases in the rest of the boundary film according to normal back diffusion of specific salts.
Figure 9C:
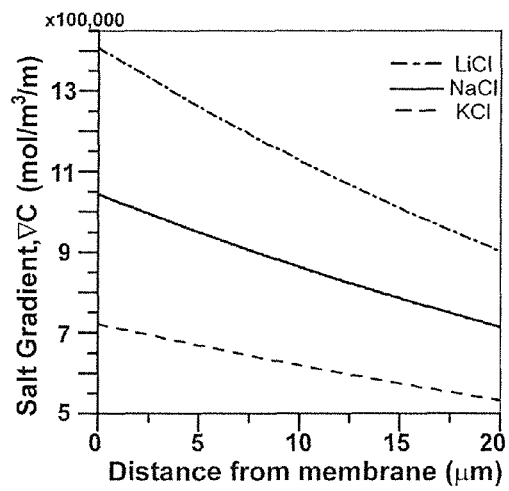
FIG. 9C illustrates the concentration gradient generated within 20 μm of the membrane surface (within the cake layer) for an experimental RO system, demonstrating that high salt concentration gradients exist in the cake layer adjacent to the membrane due to hindered diffusion of salts.
Figure 9D:
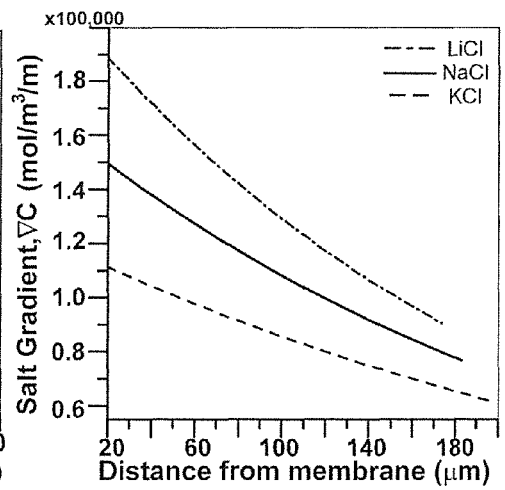
FIG. 9D illustrates the concentration gradient generated outside of 20 μm from the membrane surface of the concentration boundary layer in an experimental system demonstrating that the concentration gradient decreases with distance from the membrane cake layer towards bulk according to diffusivity values of the salts.

The extent of concentration polarization increases with decreasing diffusivity of the salt in the order KCl, NaCl, and then LiCl. FIG. 9A shows the calculated concentration profile within 20 μm of the membrane surface (within the cake layer) and FIG. 9B shows the concentration profile in the rest of the concentration boundary layer. FIG. 9C and FIG. 9D show the concentration gradient generated within 20 μm of the membrane surface (within the cake layer) and in the rest of the boundary layer, respectively. It can be clearly seen that: 1) Cake Enhanced Concentration Polarization (CECP) increases with decreasing diffusivity of the ions as described by the current theoretical models; and 2) concentration gradients are highest within the deposited cake layer when compared to the rest of the concentration boundary layer. However, these concentration gradients alone are not sufficient to describe the trends in flux decline observed with various salts.

Different Values of CECP for Different Salts Set Up Different Diffusiophoretic Driving Forces for Particle Deposition.

Figure 10A:
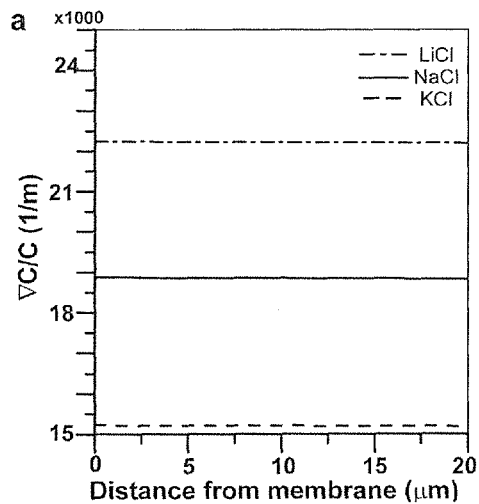
FIG. 10A shows the driving force for diffusiophoresis of particles within 20 μm of the membrane surface calculated for the various salts used illustrating that the diffusiophoretic driving factor $\nabla c/c$) stays very high in the nascent cake layer and that LiCl generates the highest diffusiophoretic driving force among the three salts.
Figure 10B:
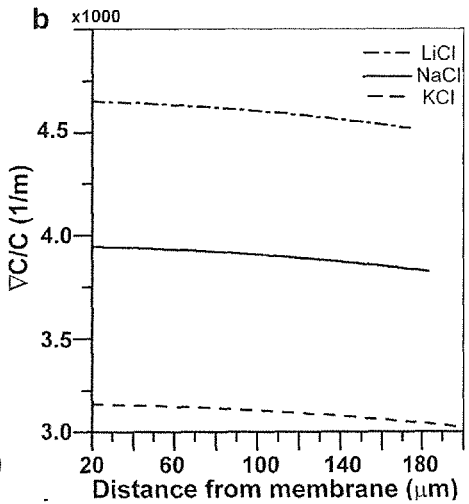
FIG. 10B shows the driving force for diffusiophoresis of particles outside of 20 μm from the membrane surface calculated for the various salts used illustrating that the diffusiophoretic driving factor decreases away from the cake layer due to larger drop in concentration gradients than concentrations.
Figure 10C:
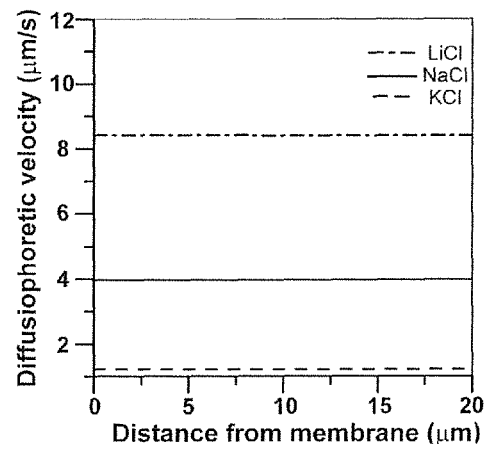
FIG. 10C illustrates the diffusiophoretic velocity of particles within 20 μm of the membrane surface calculated for the various salts used illustrating that diffusiophoretic velocity in the cake layer is significant and correlates to respective $\beta$ values of the salts.
Figure 10D:
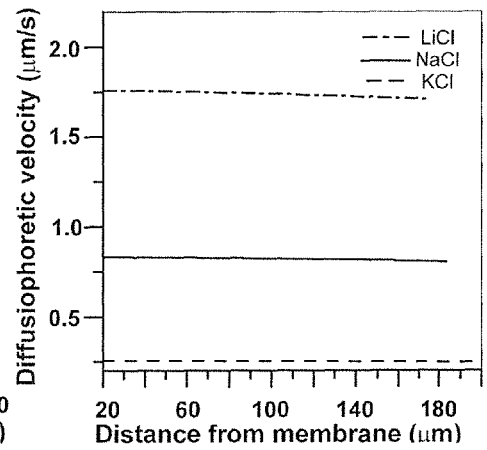
FIG. 10D illustrates the diffusiophoretic velocity of particles outside 20 μm of the membrane surface calculated for the various salts used illustrating that diffusiophoretic velocities are smaller outside cake region compared to inside cake.
Figures 10E, 10F:
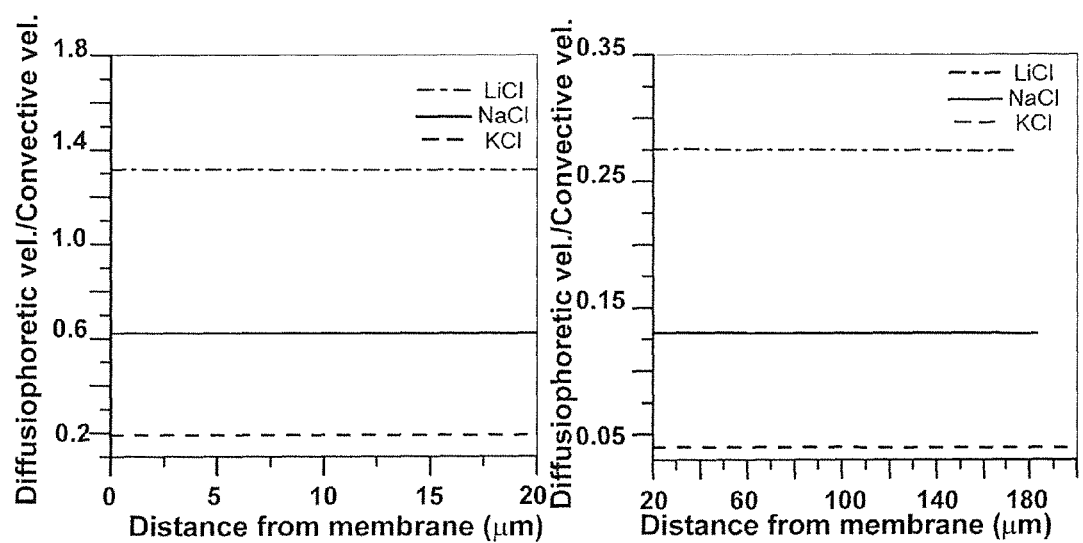
FIG. 10E illustrates the ratio of diffusiophoretic velocity to convective velocity of particles within 20 μm of the membrane surface calculated for the various salts used illustrating that DP dominates over convective particle transport in the cake layer for LiCl with cake formation accelerated by DP.
FIG. 10F illustrates the ratio of diffusiophoretic velocity to convective velocity of particles outside 20 μm of the membrane surface calculated for the various salts used illustrating that DP stays constant outside the cake layer but still remains considerable compared to convective velocities.

The high concentration gradients next to the membrane (in the $\delta_c$ region) described using the CECP theory will provide a high driving force (∇C/C) for DP of particles from the boundary layer into the cake region. This will lead to a higher deposition rate of particles than that prediced by simple permeation driven convective deposition. FIGS. 10A and B show the driving force for diffusiophoressis of particles calculated for the various salts used. KCl, which represents the base case where very small extent of diffusiophosresis is expected to occur, provides the lowest driving force (∇C/C) followed by the salt of interest (NaCl) and then LiCl. Again the gradient is higher within the cake layer (FIG. 10A) which could lead to cake compaction by DP. The diffusiophoretic driving force remains almost constant inside the cake layer (~0.2% variation) due to the negligible variation in velocity with position y. However, outside the cake layer (FIG. 10B), v(y) decreases and ∇C decreases more rapidly than C. This gives a slightly decaying driving force outside the cake layer (~2% variation). The dominant effect on the calculated diffusiophoretic velocity of the particles is the difference in the values of β, with the diffusiophoretic velocity for the LiCl approximately twice that in the NaCl solution with KCl giving rise to a much smaller diffusiophoretic velocity (FIGS. 10C and D). Note that the diffusiophoretic velocity in the KCl solution is still significant (20% of the convective velocity) due to the chemiphoretic contribution (second terra on the right hand side of Equation 1).

Particle Deposition Rate Trends Calculated Incorporating the Effect of DP Correlates with Experimentally Observed Cake Formation Rate and Flux Decline.

Figure 11A:
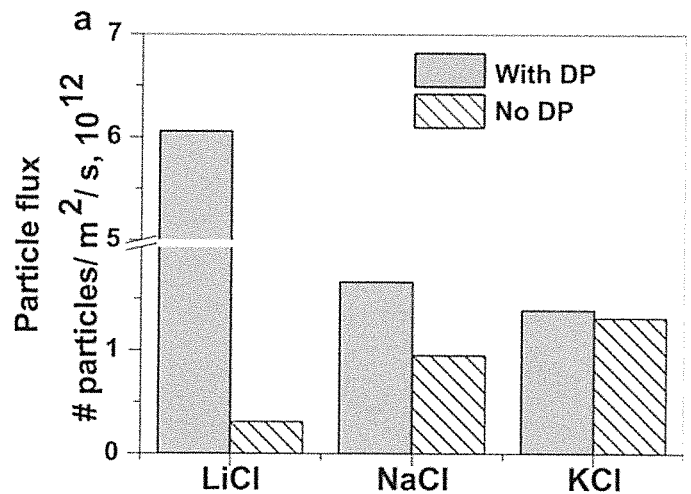
FIG. 11A shows the particle fluxes calculated for RO operation, calculated with and without the contribution of DP, for the three different salts illustrating that diffusiophoretic particle flux (scaled with $10^{12}$) at the boundary of dense cake and loose cake layers are almost 95% higher than convective flux (equivalent to water flux=23 LMH) towards the membrane for LiCl and 43% higher for NaCl where KCl gave only 6% particle flux increment when compared to convective flux at the same position due to weak DP.

The contribution of DP to particle deposition (particle flux) and subsequent flux decline is significant and was demonstrated by modeling and experimental work. FIG. 11A shows the particle fluxes calculated for RO operation, calculated with and without the contribution of DP, for the three different salts. Zeta potentials of −29 mV, −33 mV and −41 mV were measured for the silica nanoparticles in 20 mM KCl, NaCl, and LiCl (Table 1), leading to the greatest electrostatic repulsion between the membrane and the particle in the LiCl solution. When DP is not considered, the particle deposition rate is predicted to be the lowest for LiCl and highest for KCl, primarily due to difference in the particle zeta potential in the different salt solutions arising from different extents of ion adsorption to silica surfaces. However, this is completely opposite to what is seen in the experimental data for the permeate flux decline (FIG. 10). In contrast, if DP is taken into account in the particle flux calculations, the particle flux pattern is consistent with observations for the permeate flux decline, with the greatest rate of particle deposition seen with the highest fouling LiCl solution. Thus, DP, like convection, can overcome electrostatic potential barriers between the negatively charged particles and membranes.

Figure 11B:
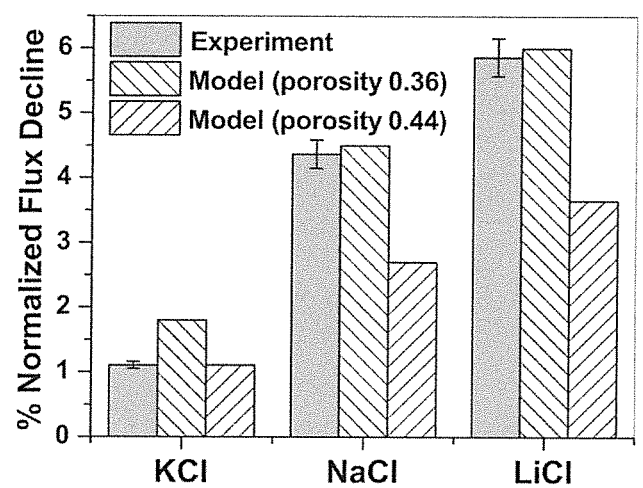
FIG. 11B illustrates comparisons between modeled and experimental percent normalized flux decline due to colloidal fouling calculated using measured cake growth rates for different salts illustrating that the predicted and observed permeate flux declines are in reasonable agreement (at 600 min), where with $\epsilon$=0.44 experimental and modeled flux decline for KCl gave better fit than with $\epsilon$=0.36 implying that KCl forms a relatively loose cake compared to NaCl and LiCl cases, where dense random porosity (0.36) gave better fit than loose cake porosity (0.44)

As expected from the low β value of KCl, where a smaller contribution from DP is expected, the difference in particle flux with and without taking DP into account is small. When NaCl or LiCl is considered as the salt in the RO system the particle fluxes and thus particle deposition rates are expected to be 43% and 95% higher, respectively, when DP is taken into account. The predicted higher flux of particles is reflected in the experimental values for the flux decline. When particle removal was monitored in the RO system and cake growth rate was estimated, a higher cake growth rate was clearly seen for NaCl and LiCl when compared to KCl (Table 1). When this cake growth rate is considered, the observed extent of flux decline and modeled flux decline are in good agreement indicating that DP induced particle deposition is an integral part of modeling RO fouling. Cake growth rates were nearly constant in the early stages of fouling and therefore, these linear growth rates (average cake growth rate in Table 1) were incorporated into the flux decline model. Two cases are presented in FIG. 11B. As can be seen, model calculations using a higher porosity cake (less compact cake, porosity ~0.44) works better for the KCl solution where DP is minimal, while a lower porosity (highly compacted cake, porosity ~0.36) works best for NaCl and LiCl, suggesting that cake compaction is enhanced by DP.

This study has shown through experiments and modeling that diffusiophoretic particle deposition in RO systems is an important mechanism for fouling. The consideration of this phenomenon is important in RO systems operating on low salinity waters such as recycled wastewaters and brackish surface and ground waters.

Example 3

Two solid materials are formed with embedded microparticles. The first is a polyacrylamide hydrogel with $CaCO_3$ microparticles embedded. Calcium carbonate microparticles are formed as in Example 1 using a route described by Volodkin et al., *Langmuir*, 2004; 20:3398-3406. The microparticles are embedded into a polyacrylamide hydrogel by combining the microparticles with acrylamide in water and crosslinking with bisacrylamide.

Briefly, a commercially available ultrapure 38.96% acrylamide/1.04% bisacrylamide (total 40% solution in water; G-Biosciences, St. Louis, USA) mixture in water was used as starting material for polymerization. For example, 20 ml of the above mixture was mixed with 15 ml of DI water to synthesize 30% gel. NaCl was added in the mixture in an amount sufficient to make it equal to the RO feed concentration. For example, 0.042 g NaCl could be added in 35 ml of above mixture to be used for 20 mM feed concentration. Certain volume (eg. 15 µL) of $CaCO_3$ microparticles as prepared in Example 1 was added. It is recommended to use the settled fraction of $CaCO_3$ microparticles to maximize the number concentration inside the gel. Thus, the volume is a volume of packed microparticles. The mixture was kept under vigorous stirring to prevent any settling of $CaCO_3$ microparticles and to keep the mixture homogeneous. 192 µL of 10% ammonium persulfate (APS) initiator was added to this solution and stirring was continued for another 10 minutes. Then 24 µL of tetramethylethylenediamine (TEMED) was added to the mixture as free radical supplier. Stirring was stopped immediately and the resultant mixture was injected into a fabricated glass mold to get thin gel sheet. The polymerization could be preferably performed on thin nylon mesh to form more rigid gel structure, easy to handle and place inside a RO system.

Figure 12:
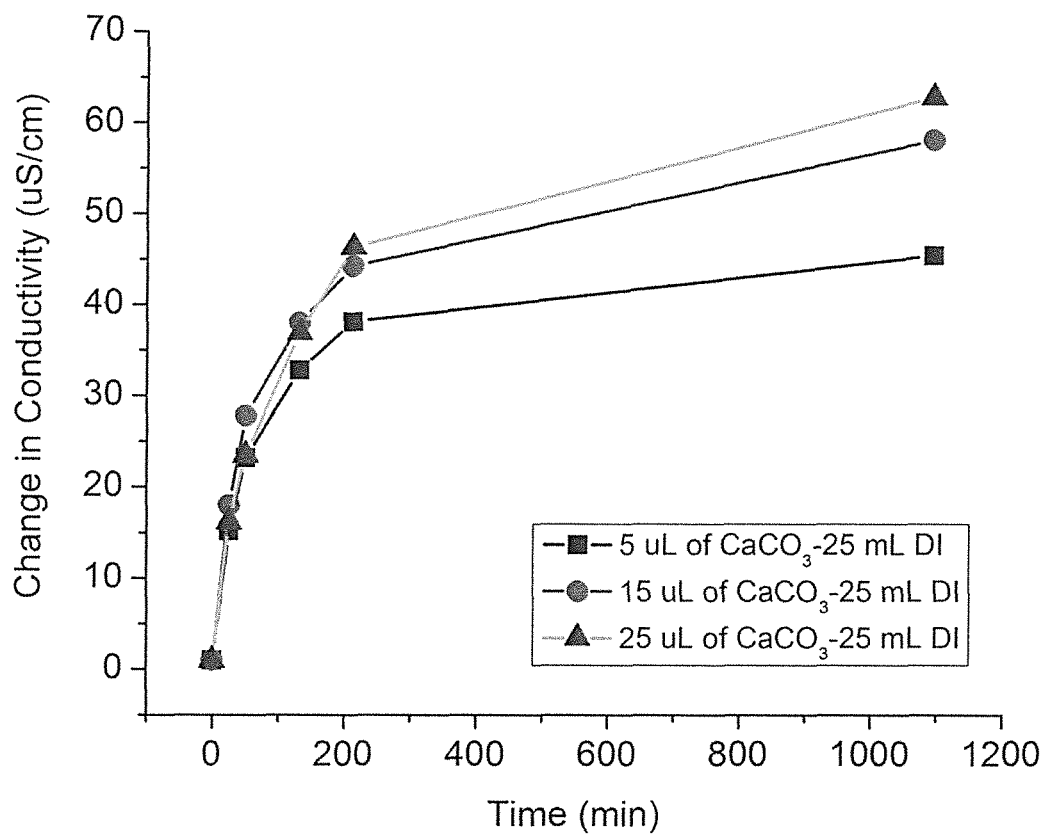
FIG. 12 illustrates the relative release rates of ion from various calcium carbonate microparticle containing hydrogels.

Various amounts of microparticles are embedded into polyacrylamide hydrogel. The resulting gels are then tested for change in conductivity with results depicted in FIG. 12. Increasing the amount of microparticle from 5 µl to 15 µl significantly improved the resulting conductivity. Further increasing the amount to 25 ml did not show appreciable improvement. From this, the optimum ratio of microparticles to polymer is found to be 15 µl of settled fraction following manufacture according to Example 1 and final centrifugation.

Figure 13:
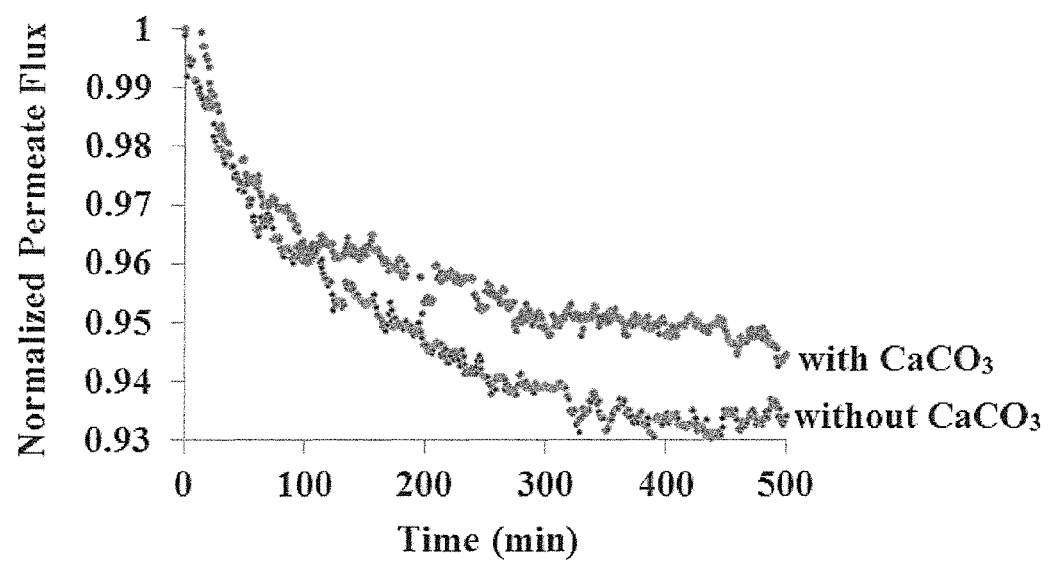
FIG. 13 illustrates improved reduction in permeate flux rates across a membrane when the membrane is placed in proximity to a microparticle containing hydrogel.

The hydrogel is combined with an RO membrane in a test system such as in Example 2. The microparticle containing hydrogel is separate by a 26 mil spacer from the membrane and flow is performed as in Example 2. The resulting normalized permeate flux is depicted in FIG. 13. A clear improvement in flow rate is achieved in the presence of the microparticle embedded hydrogel.

Figure 14A:
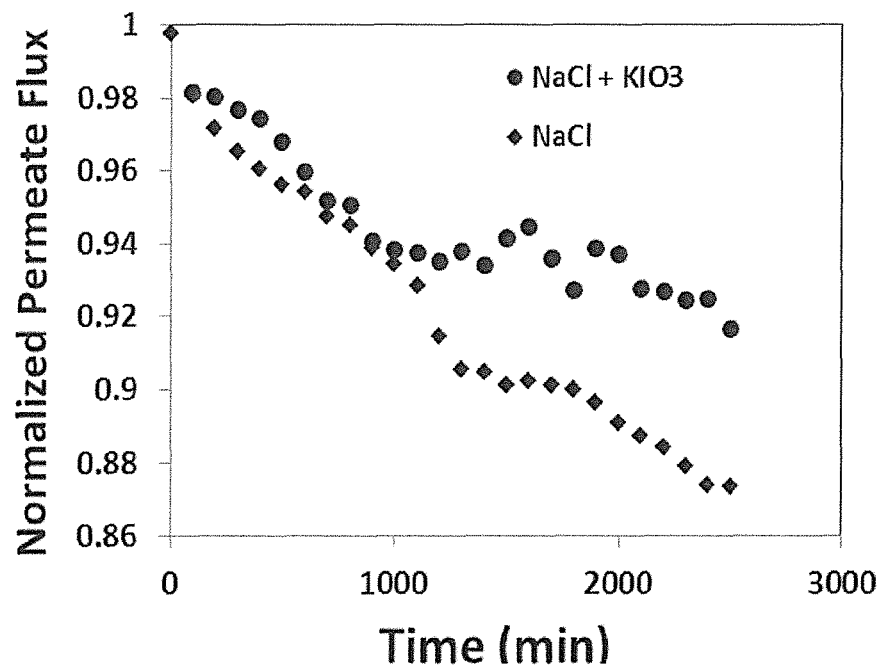
FIG. 14A illustrates permeate flux profile with time under similar hydrodynamic and experimental conditions between only 20 mM NaCl feed conc. and 2 mM KIO$_3$+18 mM NaCl feed conc. in RO system.
Figure 14B:
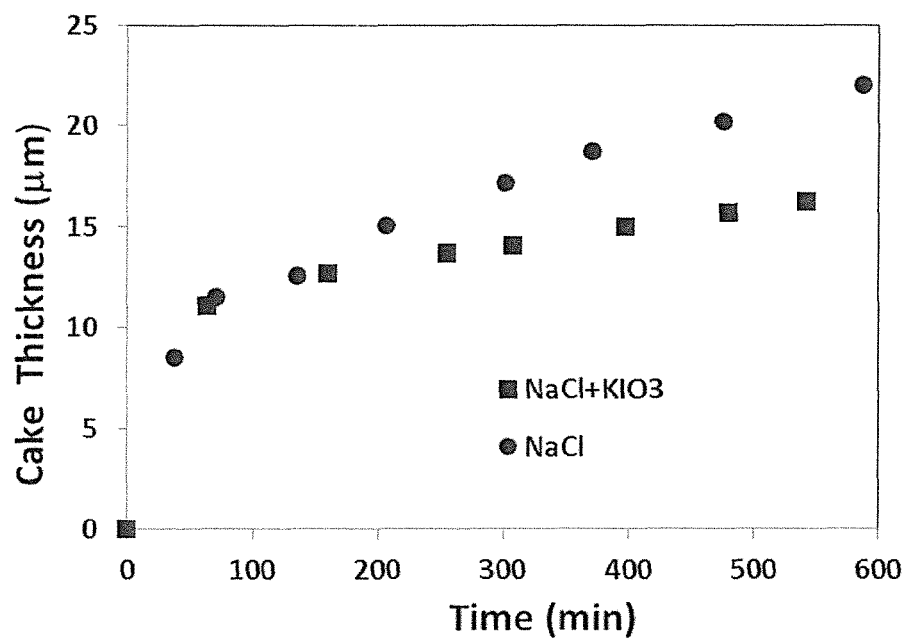
FIG. 14B illustrates cake build up rates with time between only 20 mM NaCl feed conc. and 2 mM KIO$_3$+18 mM NaCl feed conc. in RO system.

Example 4

β+ve salts were dosed with feed as mentioned in Example 2. This is the simplest possible fouling reduction procedure employing diffusiophoresis. For example, 2 mM potassium iodate ($KIO_3$, β=+0.29) could be charged with 18 mM NaCl in the conditioning stage. Thereafter, 4 liter 0.017% 80 nm silica nanoparticles could be charged as feed with same salt concentration as in the conditioning stage. The flux decline would be mitigated over longer time as β+ve salts resist cake compaction. For example, using the above composition, considerable flux improvement was realized over longer time (~2 days) in comparison with flux decline only with 20 mM NaCl in feed (FIG. 14A). $KIO_3$ imparted slower cake growth due to generation of reverse in-situ electric field (FIG. 14B). Similar effect is expected from potassium acetate (β=+0.28) as dosing salt. On the other hand, potassium hydrogen phosphate (β=+0.38), potassium citrate (β=+0.54), etc. are expected to provide better flux decline mitigation. The concentration of these additive salts could be maintained ~1:10 molar ratios with NaCl or even less.

Using dissolved $CO_2$ in the feed, the β value could be increased even further (β~+0.77) due to highly diffusive dissociated protons. pH decrease during operation could be buffered using β+ve $KH_2PO_4$. $CO_2$ could be bubbled at the feed inlet tank or could be pressurized inside an enclosed feed pressure vessel to dissolve more $CO_2$ to the extent of maintaining constant pH.

The invention is not restricted to the illustrative examples described herein. Examples described are exemplary, and are not intended to limit the scope of the invention. Changes therein, other combinations of elements, and other uses will occur to those skilled in the art based on this description.

REFERENCE LIST (1) Faibish, R. S., Elimelech, M., Cohen, Y. Effect of interparticle electrostatic double layer interactions on permeate flux decline in crossflow membrane filtration of colloidal suspensions: an experimental investigation. *J. Coll. Int. Sc.* 1998, 204, 77-86.
(2) Hadidi, M., Zydney, A. L. Fouling behavior of zwitterionic membranes: Impact of electrostatic and hydrophobic interactions. *J. Mem. Sc.* 2013, 452, 97-103.
(3) Derjaguin, B. V.; Sidorenkov, G. P.; Zubashchenkov, E. A.; Kiseleva, E. V. Kinetic Phenomena in Boundary Films of Liquids. *Kolloidn. Zh.* 1947, 9, 335-347.
(4) Anderson, J. L.; Lowell, M. E.; Prieve, D.C. Motion of a Particle Generated by Chemical Gradients. Part I: Non-Electrolytes. *J. Fluid Mech.* 1982, 117, 107-121.
(5) Prieve, D. C.; Anderson, J. L.; Ebel, J. P.; Lowell, M. E. Motion of a particle generated by chemical gradients. Part 2. Electrolytes. *J. Fluid Mech.* 1984, 148, 247-269.
(6) Anderson, J. L. Colloidal transport by interfacial forces. *Ann. Rev. Fluid Mech.* 1989, 21, 61-99.
(7) Abecassis, B.; Bizonne, C. C.; Ybert, C.; Ajdari, A.; Bocquet, L. Boosting migration of large particles by solute contrasts. *Nature Materials* 2008, 7, 785-789.
(8) Ebel, J. P.; Anderson, J. L.; Prieve, D. C. Diffusiophoresis of latex particles in electrolyte gradients. *Langmuir* 1988, 4, 396-406.
(9) Chen, Y. P.; Keh, H. J. Diffusiophoresis and Electrophoresis of a Charged Sphere Parallel to One or Two Plane Walls. *J. Col. Int. Sci* 2005, 286, 784-791.
(10) McDermott, J.; Kar, A.; Daher, M.; Kiara, S.; Wang, G.; Sen, A.; Velegol, D. Self-generated diffusioosmotic flows from calcium carbonate micropumps. *Langmuir* 2012, 28, 15491-15497.
(11) Sun, S.; Yue, Y.; Huang, X.; Meng, D. Protein Adsorption on Blood-Contact Membranes. *J. Mem. Sci.* 2003, 222, 3-18.
(12) Ahrer, K.; Buchacher, A.; Iberer, G.; Jungbauer, A. Effects of ultra-/diafiltration conditions on present aggregates in human immunoglobulin G preparations. *J. Mem. Sci.* 2006, 274, 108-115
(13) Rosenberg, E.; Hepbildikler, S.; Kuhne, W.; Winter, G. Ultrafiltration concentration of monoclonal antibody solutions: Development of an optimized method minimizing aggregation. *J. Mem. Sci.* 2009, 342, 50-59.
(14) Song, L.; Elimelech, M. Particle deposition onto a permeable surface in laminar flow. *J. Col. Int. Sci.* 1995, 173, 165-180.
(15) Hoek, E. M. V.; Kim, A. S.; Elimelech, M. Influence of crossflow membrane filter geometry and shear rate on colloidal fouling in reverse osmosis and nanofiltration separations. *Environ. Eng. Sci.* 2002, 19, 357-372.
(16) Hoek, E. V. M., Elimelech, M. Cake-enhanced concentration polarization: a new fouling mechanism for salt rejecting membranes. *Environmental science & technology* 2003, 37, 5581-5588.
(17) Nuang, S.; Ye, Y.; Chen, V.; Fane, A. G. Investigations of the coupled effect of cake-enhanced osmotic pressure and colloidal fouling in RO using crossflow sampler-modified fouling index ultrafiltration. *Desalination* 2011, 273, 184-196.
(18) Volodkin, D. V.; Petrov, A. I.; Prevot, M.; Sukhorukov, G. B. Matrix polyelectrolyte microcapsules: new system for macromolecule encapsulation. *Langmuir* 2004, 20, 3398-3406.
(19) Biwersi, J.; Tulk, B.; Verkman, A. S. Long-wavelength chloride sensitive fluorescent indicators. *Anal. Biochem.* 1994, 219, 139-143.
(20) Li, Y.; Zhu, H.; Kuppusamy, P.; Roubaud, V.; Zweier, J. L.; Trush, M. A. Validation of lucigenin (bis-N-methylacridinium) as a chemilumigenic probe for detecting superoxide anion radical production by enzymatic and cellular systems. *J. Bio. Chem.* 1998, 273, 2015-2023.
(21) Staffeld, P. O.; Quinn, J. A. Diffusion-Induced Banding of Colloidal Particles via Diffusiophoresis 1. Electrolytes. *J. Col. Int. Sci.* 1989, 130, 69-87.
(22) Palacci, J.; Bizonne, C. C.; Ybert, C.; Bocquet, L. Osmotic traps for colloids and macromolecules based on logarithmic sensing in salt taxis. *Soft Matter* 2012, 8, 980-994.
(23) Hidy, G. M.; Brock, J. R. Lung deposition of aerosol—a footnote on the role of diffusiophoresis. *Environ. Sci. Technol.* 1969, 3, 563-567.
(24) Lehtinen, K. E. J.; Hokkinen, J.; Jokinemi, J.; Gamble, R. E. Studies on Steam Condensation and Particle Diffusiophoresis in a Heat Exchanger Tube. *Nuclear Engineering and Design* 2002, 213, 67-77.
(25) Grohn, A.; Suonmaa, V.; Auvinen, A.; K. Lehtinen, K. E. J.; Jokiniemi, J. Reduction of fine particle emissions from wood combustion with optimized condensing heat exchangers. *Environ. Sci. Technol.* 2009, 43, 6269-6274.
(26) Yamazaki, K.; Matsuda, M.; Yamamoto, K.; Yakushiji, T.; Sakai, K. Internal and surface structure characterization of cellulose triacetate hollow fiber dialysis membranes. *J. Membrane Sci.* 2011, 368, 34-40.

Various modifications of the present invention, in addition to those shown and described herein, will be apparent to those skilled in the art of the above description. Such modifications are also intended to fall within the scope of the appended claims.

It is appreciated that all reagents are obtainable by sources known in the art unless otherwise specified.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A process of removing deposits on a membrane comprising:
    placing a membrane in a solvent comprising a microparticles, said microparticles comprising a salt,
    said microparticles housed in a retaining structure positioned within 1000 micrometers from said membrane and said microparticites in contact with said solvent relative to said membrane so as to produce a gradient generated spontaneous electric field or a gradient generated spontaneous chemiphoretic field, said field in said solvent proximal to said membrane;
    said electric field removing or preventing deposits of particles on said membrane.

2. The process of claim 1 wherein said salt comprises a cation and an anion, wherein said cation and said anion have different diffusion coefficients in said solvent.

3. The process of claim 2 wherein said anion has a higher diffusion coefficient than said cation.

4. The process of claim 1 wherein said salt is a carbonate.

5. The process of claim 4 wherein said carbonate is selected from the group consisting of $CaCO_3$, $Na_2CO_3$, $BaCO_3$, $H_2CO_3$, $MgCO_3$, $Li_2CO_3$, and $K_2CO_3$.

6. The process of claim 1 wherein said salt is selected from the group consisting of KI, NaCl, LiCl, and KCl.

7. The process of claim 1 wherein said microparticles are housed in a hydrogel.

8. The process of claim 1 wherein said microparticles have a diameter of 1 nanometer to 100 micrometers.

9. The process of claim 1 wherein said microparticles have a diameter of 3 micrometers to 15 micrometers.

10. The process of claim 1 where said solvent is aqueous.

11. The process of claim 1 wherein said membrane is neutral or negatively charged.

12. The process of claim 1 wherein said membrane is negatively charged.

13. The process of claim 1 wherein said membrane comprises a polyamide, cellulose acetate, or combinations thereof.

14. A process of cleaning a reverse osmosis membrane comprising:
    placing microparticles, in a solvent contacting said membrane comprising a membrane charge, said microparticles comprising a salt, acid or base, wherein a diffusion coefficient of an ion of said salt matching said membrane charge is greater than a counter ion of said salt, said
    said microparticles positioned relative to said membrane so as to produce a gradient generated spontaneous electric field or a gradient generated spontaneous chemiphoretic field, aid field in said solvent proximal to said membrane;
    said microparticles housed in a retaining structure placed within 1000 micrometers from aid membrane;
    said field removing deposits of particles on said membrane.

15. The process of claim 14 wherein said salt is selected from the group consisting of $CaCO_3$, $Na_2CO_3$, $BaCO_3$, $H_2CO_3$, $MgCO_3$, $Li_2CO_3$, $K_2CO_3$, KI, NaCl , LiCl , and KCl .

16. The process of claim 14 wherein said microparticles remain in said solvent for a period of 1 hour or more.

17. The process of claim 14 wherein at least a portion of said particles have a neutral charge.

* * * * *